(12) United States Patent
Johnson

(10) Patent No.: US 12,692,970 B1
(45) Date of Patent: Jul. 28, 2026

(54) MONITOR STAND WITH LINEARLY ADJUSTABLE HEIGHT AND REACH

(71) Applicant: Ronald B. Johnson, Honokaa, HI (US)

(72) Inventor: Ronald B. Johnson, Honokaa, HI (US)

( * ) Notice: Subject to any disclaimer, the term of this patent is extended or adjusted under 35 U.S.C. 154(b) by 46 days.

(21) Appl. No.: 19/018,864

(22) Filed: Jan. 13, 2025

(51) Int. Cl.
 *F16M 11/04* (2006.01)

(52) U.S. Cl.
 CPC ......... *F16M 11/046* (2013.01); *F16M 11/048* (2013.01); *F16M 2200/048* (2013.01); *F16M 2200/063* (2013.01); *F16M 2200/066* (2013.01); *F16M 2200/068* (2013.01)

(58) Field of Classification Search
 None
 See application file for complete search history.

(56) References Cited

U.S. PATENT DOCUMENTS

| | | | | |
|---|---|---|---|---|
| 8,070,114 | B2 * | 12/2011 | Chen ................. | F16M 11/2021 |
| | | | | 248/278.1 |
| 8,469,323 | B1 * | 6/2013 | Deros ................. | F16M 11/105 |
| | | | | 248/124.2 |
| 9,625,082 | B2 * | 4/2017 | Blackburn ......... | F16M 11/2014 |
| 11,089,865 | B2 * | 8/2021 | Knapp ................ | F16M 13/022 |

| | | | | |
|---|---|---|---|---|
| 2014/0361134 | A1 * | 12/2014 | Chuang ............. | F16M 11/2092 |
| | | | | 248/276.1 |
| 2014/0367137 | A1 * | 12/2014 | Leung ................ | F16M 11/2014 |
| | | | | 174/68.3 |
| 2015/0053829 | A1 * | 2/2015 | Lu .......................... | F16M 11/12 |
| | | | | 248/123.11 |
| 2017/0105529 | A1 * | 4/2017 | Kozlowski, Jr. ....... | F16M 13/02 |
| 2022/0412502 | A1 * | 12/2022 | Shih .................... | F16M 11/041 |

FOREIGN PATENT DOCUMENTS

| | | | | |
|---|---|---|---|---|
| DE | 202012011859 U1 * | 1/2013 | ............. | F16M 11/24 |
| DE | 202014007930 U1 * | 11/2024 | ............. | G06F 1/601 |
| WO | WO-2023122398 A1 * | 6/2023 | ............. | A47G 29/00 |

* cited by examiner

*Primary Examiner* — Steven M Marsh
(74) *Attorney, Agent, or Firm* — Kenneth C. Booth; Booth Udall, PLC

(57) ABSTRACT

A monitor stand with a base, a first linear motion stage, a second linear motion stage, and a monitor mount. The first linear motion stage attaches to and extends away from the base and has a first end attached to the base, a second end, and a first linear guide extending between the first end and the second end. The second linear motion stage is attached to and extend away from the first linear motion stage and has a first end attached to the second linear motion stage, a second end, and a second linear guide extending between the first end and the second end. The monitor mount is fixed to the second end of the second linear motion stage and is configured to attach to and support a computer monitor. One of the first linear motion stage and the second linear motion stage comprises a horizontal Sarrus linkage.

20 Claims, 24 Drawing Sheets

MONITOR STAND WITH LINEARLY ADJUSTABLE HEIGHT AND REACH

TECHNICAL FIELD

This document relates to a monitor stand with adjustable height and reach.

BACKGROUND

In modern workspaces, ergonomics play a crucial role in enhancing productivity and ensuring the health and comfort of users. A significant component of an ergonomic workstation setup is the monitor stand, which supports computer monitors and allows users to position their screens at an optimal height and angle. Proper monitor positioning can reduce strain on the neck, shoulders, and eyes, contributing to long-term physical well-being.

Conventional monitor stands, however, often fail to address the diverse needs of users in different environments. Many fixed-height stands lack the flexibility to accommodate varying user preferences or seating arrangements. As a result, users frequently resort to makeshift solutions, such as stacking books under monitors, which can compromise stability and aesthetics. Even existing adjustable monitor stands have a small range of movement, fail to provide smooth, reliable adjustments, or interfere with the monitor's lateral orientation or tilt when adjusted, making them less effective in achieving ideal ergonomics and inconvenient to use.

Additionally, the growing trend of multi-monitor setups and shared workstations has amplified the demand for versatile and user-friendly solutions. Users require monitor stands that offer not only adjustable height but also adjustable reach, enabling them to position monitors closer or further away depending on their specific tasks and preferences. Despite this increasing demand, there remains a gap in the market for a monitor stand that combines ease of use, robust adjustability, and durable construction in a single, integrated design.

SUMMARY

Aspects of this document relate to a monitor stand, comprising a base configured to mount to a horizontal surface, a first linear motion stage attached to and extending upward from the base, the first linear motion stage comprising a first end of the first linear motion stage fixedly attached to the base, a second end of the first linear motion stage positioned above the first end of the first linear motion stage, and a vertical Sarrus linkage extending between the first end of the first linear motion stage and the second end of the first linear motion stage, the vertical Sarrus linkage having a plurality of pairs of links joining the first end of the first linear motion stage to the second end of the first linear motion stage in parallel, each of the plurality of pairs of links comprising two rigid plates coupled together with a hinge, a second linear motion stage attached to and extending forward from the first linear motion stage, the second linear motion stage comprising a first end of the second linear motion stage fixedly attached to the second end of the first linear motion stage, a second end of the second linear motion stage positioned forward from the first end of the second linear motion stage, and a horizontal Sarrus linkage extending between the first end of the second linear motion stage and the second end of the second linear motion stage, the horizontal Sarrus linkage having a plurality of pairs of links joining the first end of the second linear motion stage to the second end of the second linear motion stage in parallel, each of the plurality of pairs of links comprising two rigid plates coupled together with a hinge, a monitor mount fixedly coupled to the second end of the second linear motion stage and configured to attach to and support a computer monitor, and a spring extending between the first end of the first linear motion stage and the second end of the first linear motion stage, wherein the spring is configured to exert an upward force on the second end of the first linear motion stage and counteract a weight of at least the second linear motion stage, the monitor mount, and the computer monitor, wherein the vertical Sarrus linkage is configured to enable adjustment of a vertical position of the monitor mount with respect to the base, and wherein the horizontal Sarrus linkage is configured to enable adjustment of a horizontal position of the monitor mount with respect to the base.

Particular embodiments may comprise one or more of the following features. The spring may be a gas spring. The monitor stand may further comprise a plurality of counterweights configured to enable a user to add weight to the monitor stand above the spring to balance the weight of at least the second linear motion stage, the monitor mount, and the computer monitor with the upward force of the spring. The monitor mount may be configured to enable rotation of the computer monitor about three independent axes. The base may comprise a clamp configured to hold the base to the horizontal surface. The two rigid plates of each of the plurality of pairs of links may be configured to remain nonparallel to each other.

Aspects of this document relate to a monitor stand, comprising a base configured to mount to a horizontal surface, a first linear motion stage attached to and extending away from the base, the first linear motion stage comprising a first end of the first linear motion stage fixedly attached to the base, a second end of the first linear motion stage, and a first linear guide extending between the first end of the first linear motion stage and the second end of the first linear motion stage, a second linear motion stage attached to and extending away from the first linear motion stage, the second linear motion stage comprising a first end of the second linear motion stage fixedly attached to the second end of the first linear motion stage, a second end of the second linear motion stage, and a second linear guide extending between the first end of the second linear motion stage and the second end of the second linear motion stage, a monitor mount fixedly coupled to the second end of the second linear motion stage and configured to attach to and support a computer monitor, and a spring extending between the first end of one of the first linear motion stage and the second linear motion stage and the second end of the one of the first linear motion stage and the second linear motion stage, wherein the spring is configured to exert an upward force and counteract a weight of at least the monitor mount and the computer monitor, wherein the first linear guide is configured to enable adjustment of a first position of the monitor mount with respect to the base in a first direction, wherein the second linear guide is configured to enable adjustment of a second position of the monitor mount with respect to the base in a second direction perpendicular to the first direction, and wherein one of the first linear guide and the second linear guide is a horizontal Sarrus linkage.

Particular embodiments may comprise one or more of the following features. The second linear guide may be the horizontal Sarrus linkage, the horizontal Sarrus linkage having a plurality of pairs of links joining the first end of the second linear motion stage to the second end of the second linear motion stage in parallel, each of the plurality of pairs of links comprising two rigid plates coupled together with a hinge. The first linear guide may be a vertical Sarrus linkage. The vertical Sarrus linkage may have a plurality of pairs of links joining the first end of the first linear motion stage to the second end of the first linear motion stage in parallel, each of the plurality of pairs of links comprising two rigid plates coupled together with a hinge. The spring may be a gas spring. The monitor stand may further comprise a plurality of counterweights configured to enable a user to add weight to the monitor stand above the spring to balance the weight of at least the monitor mount and the computer monitor with the upward force of the spring. The monitor mount may be configured to enable rotation of the computer monitor about three independent axes.

Aspects of this document relate to a monitor stand, comprising a base configured to mount to a horizontal surface, a first linear motion stage attached to and extending away from the base, the first linear motion stage comprising a first end of the first linear motion stage fixedly attached to the base, a second end of the first linear motion stage, and a first linear guide extending between the first end of the first linear motion stage and the second end of the first linear motion stage, a second linear motion stage attached to and extending away from the first linear motion stage, the second linear motion stage comprising a first end of the second linear motion stage fixedly attached to the second end of the first linear motion stage, a second end of the second linear motion stage, and a second linear guide extending between the first end of the second linear motion stage and the second end of the second linear motion stage, and a monitor mount fixedly coupled to the second end of the second linear motion stage and configured to attach to and support a computer monitor, wherein the first linear guide is configured to enable adjustment of a first position of the monitor mount with respect to the base in a first direction, wherein the second linear guide is configured to enable adjustment of a second position of the monitor mount with respect to the base in a second direction different from the first direction, and wherein one of the first linear motion stage and the second linear motion stage comprises a horizontal Sarrus linkage.

Particular embodiments may comprise one or more of the following features. The second linear guide may be the horizontal Sarrus linkage. The horizontal Sarrus linkage may have a plurality of pairs of links joining the first end of the second linear motion stage to the second end of the second linear motion stage in parallel, each of the plurality of pairs of links comprising two rigid plates coupled together with a hinge. The first linear guide may be a vertical Sarrus linkage. The vertical Sarrus linkage may have a plurality of pairs of links joining the first end of the first linear motion stage to the second end of the first linear motion stage in parallel, each of the plurality of pairs of links comprising two rigid plates coupled together with a hinge. The monitor mount may be configured to enable rotation of the computer monitor about three independent axes. The base may comprise a clamp configured to hold the base to the horizontal surface.

The foregoing and other aspects, features, and advantages will be apparent from the DESCRIPTION and DRAWINGS, and from the CLAIMS if any are included.

BRIEF DESCRIPTION OF THE DRAWINGS

Implementations will hereinafter be described in conjunction with the appended and/or included DRAWINGS, where like designations denote like elements, and:

4

Figure 1:
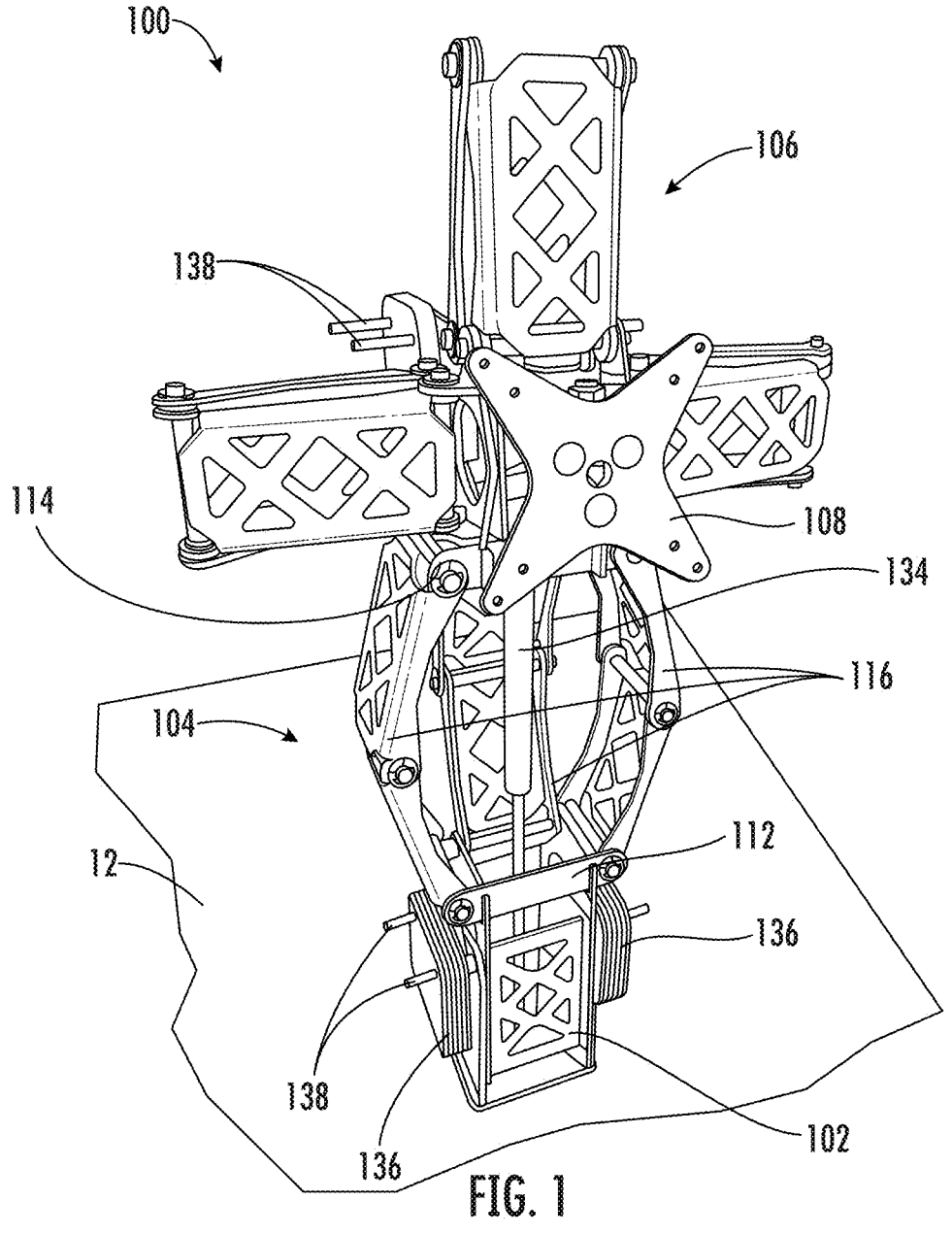
Figure 2:
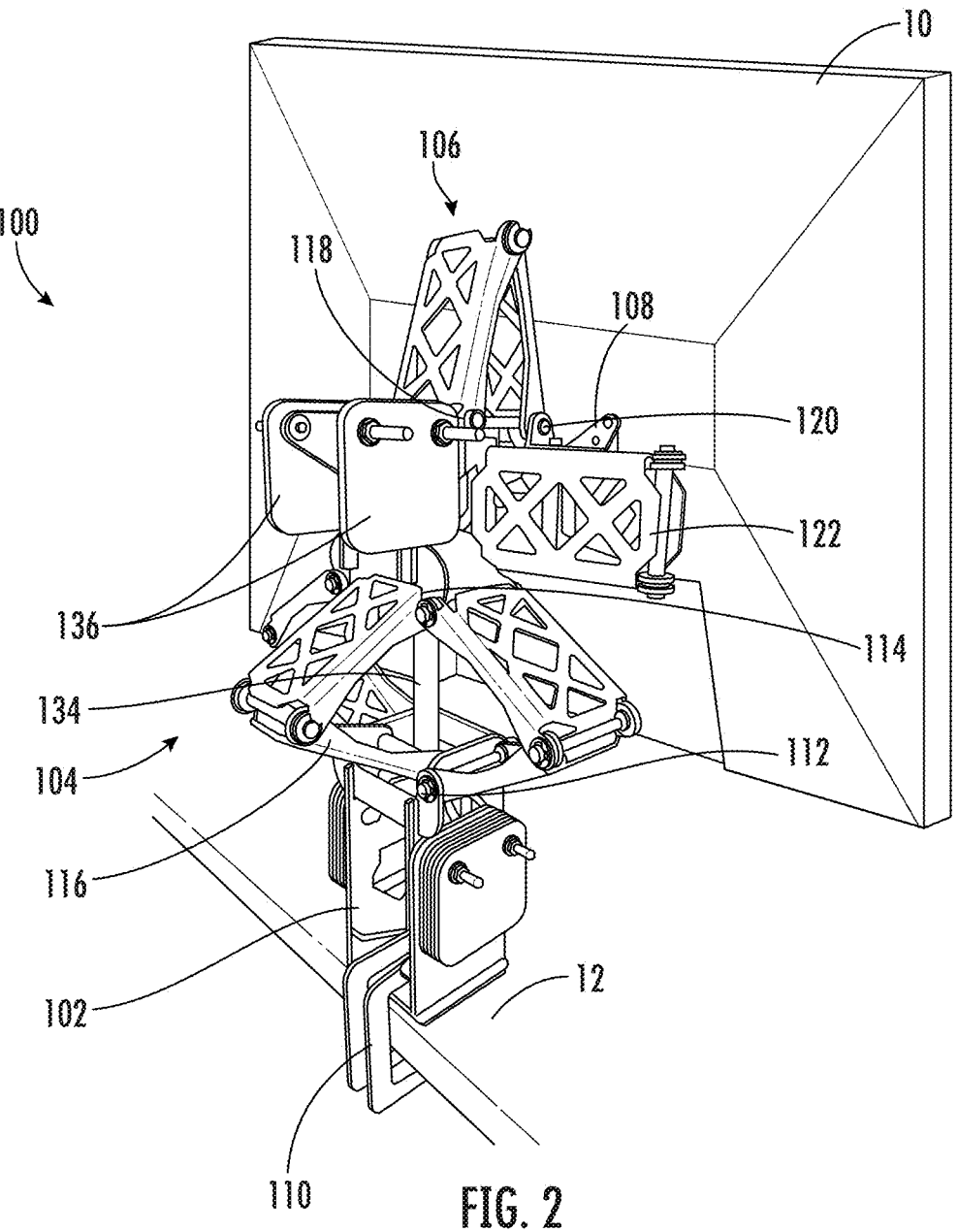
Figure 3:
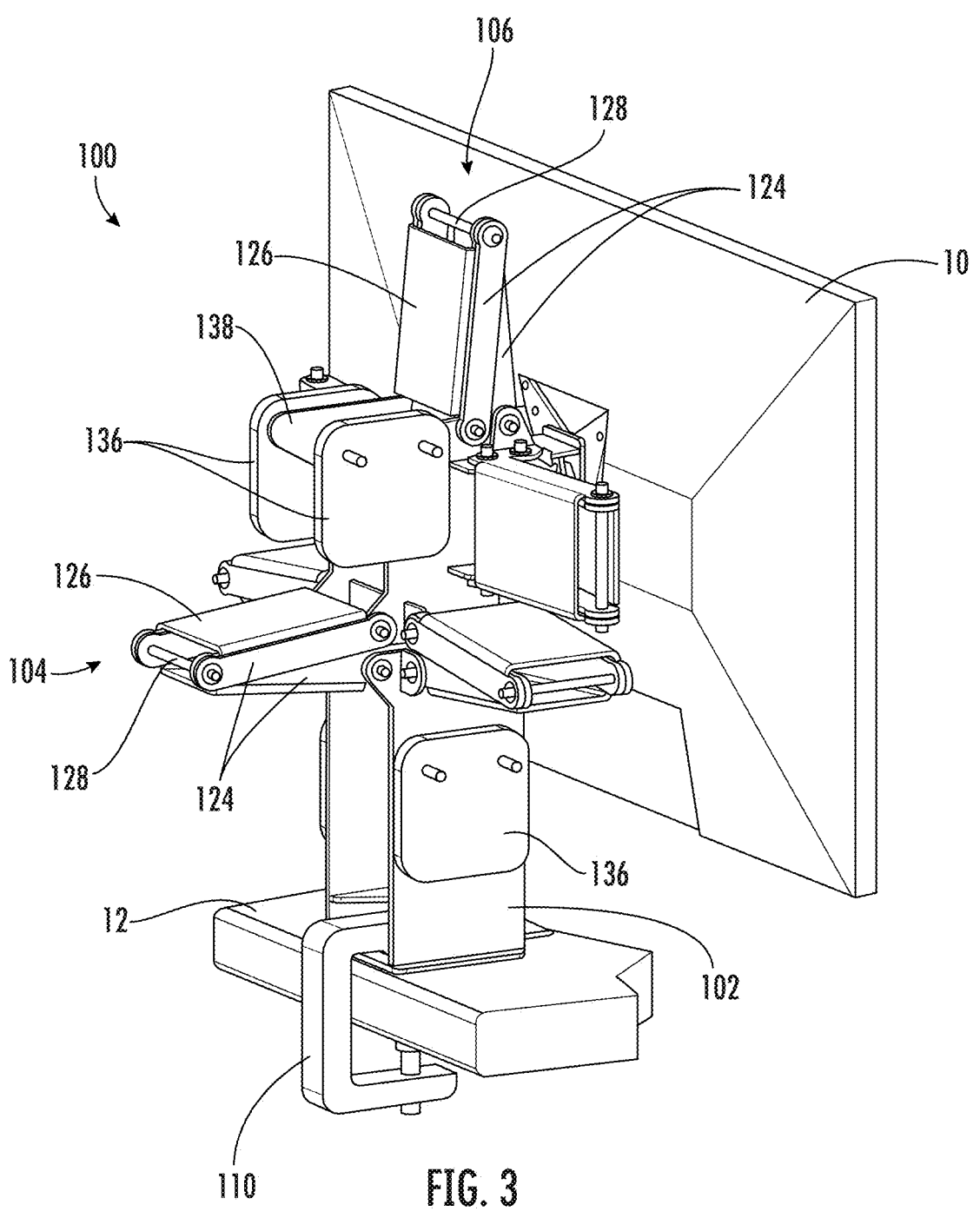
Figure 4:
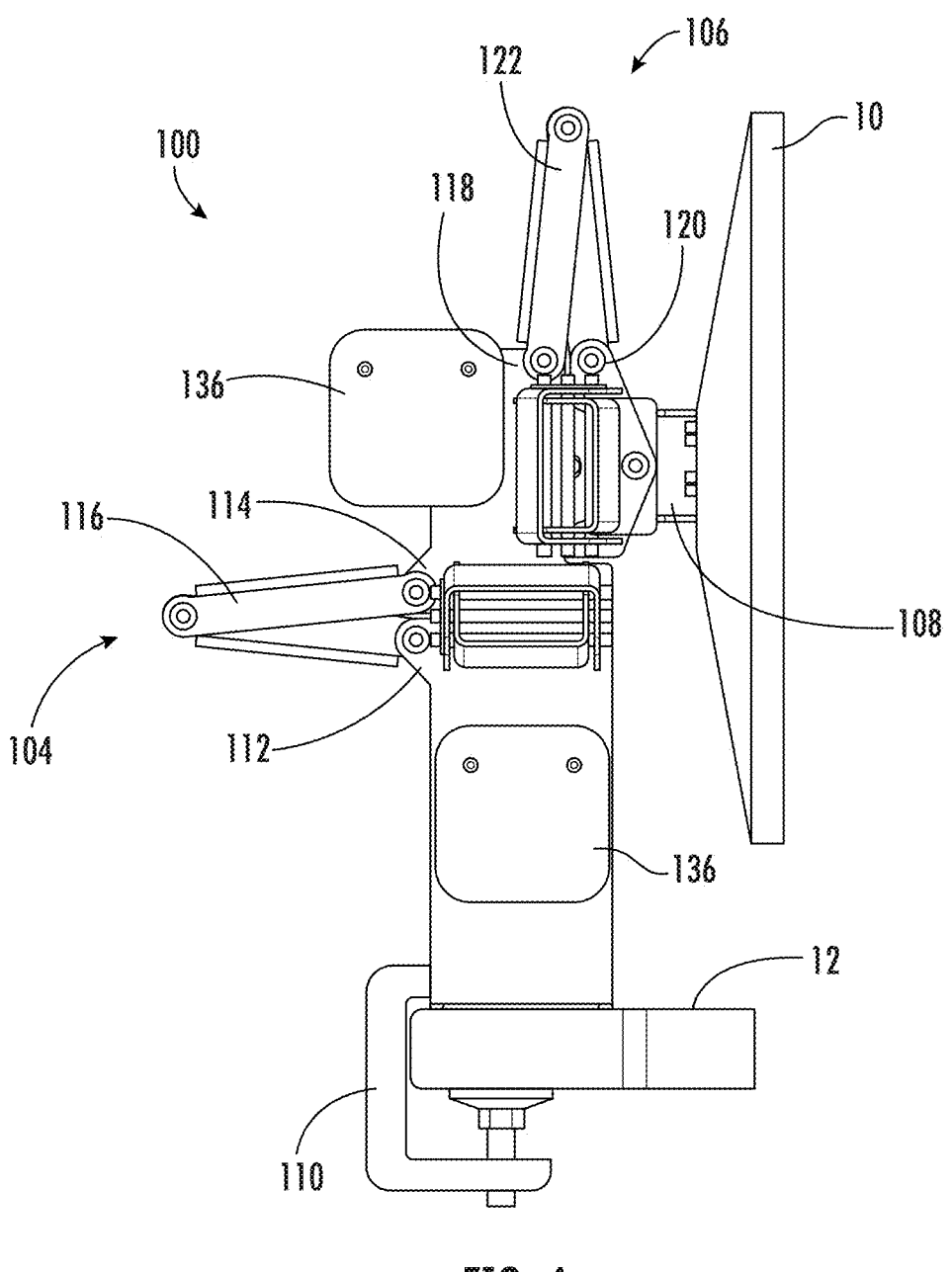
Figure 5:
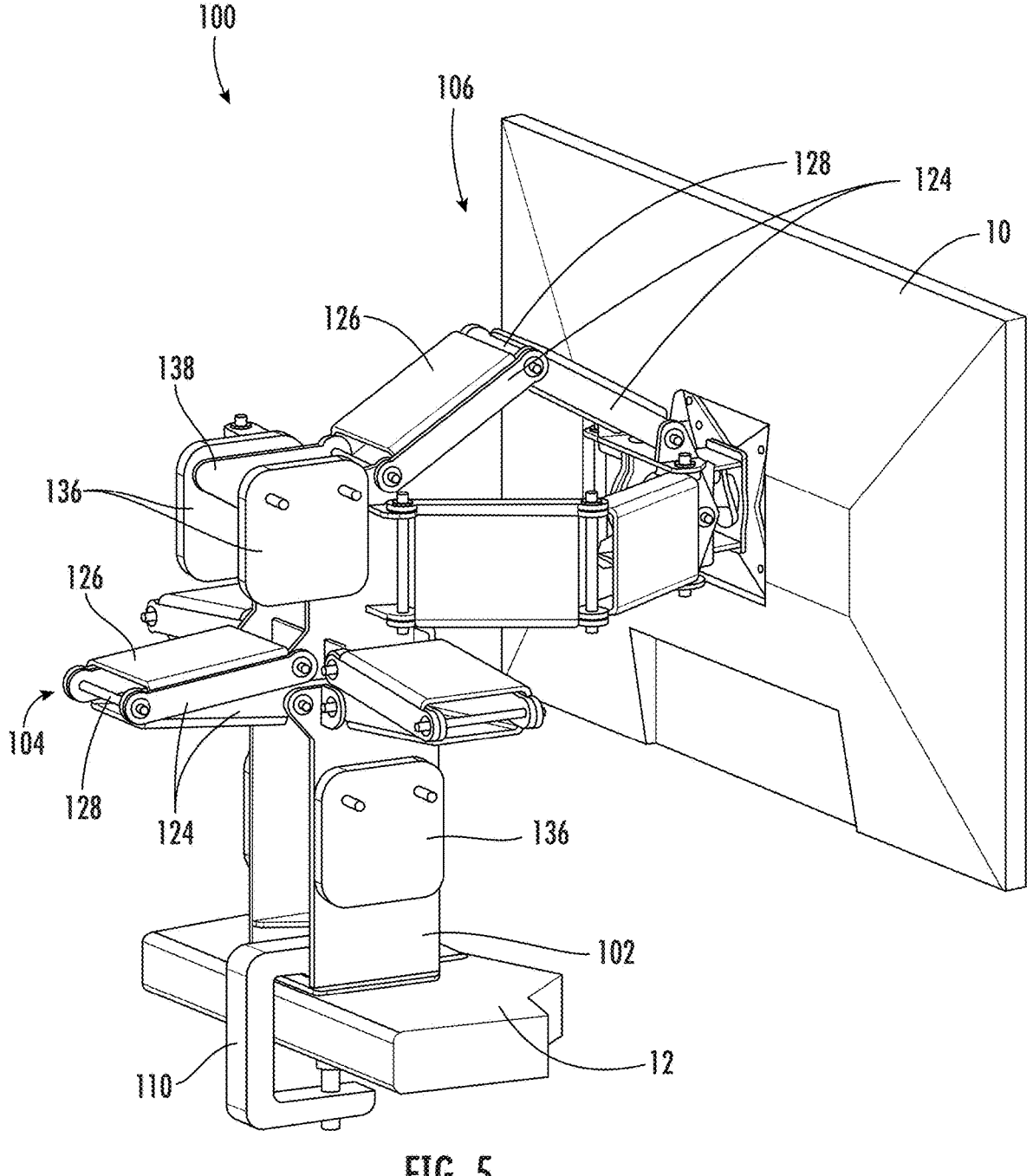
Figure 6:
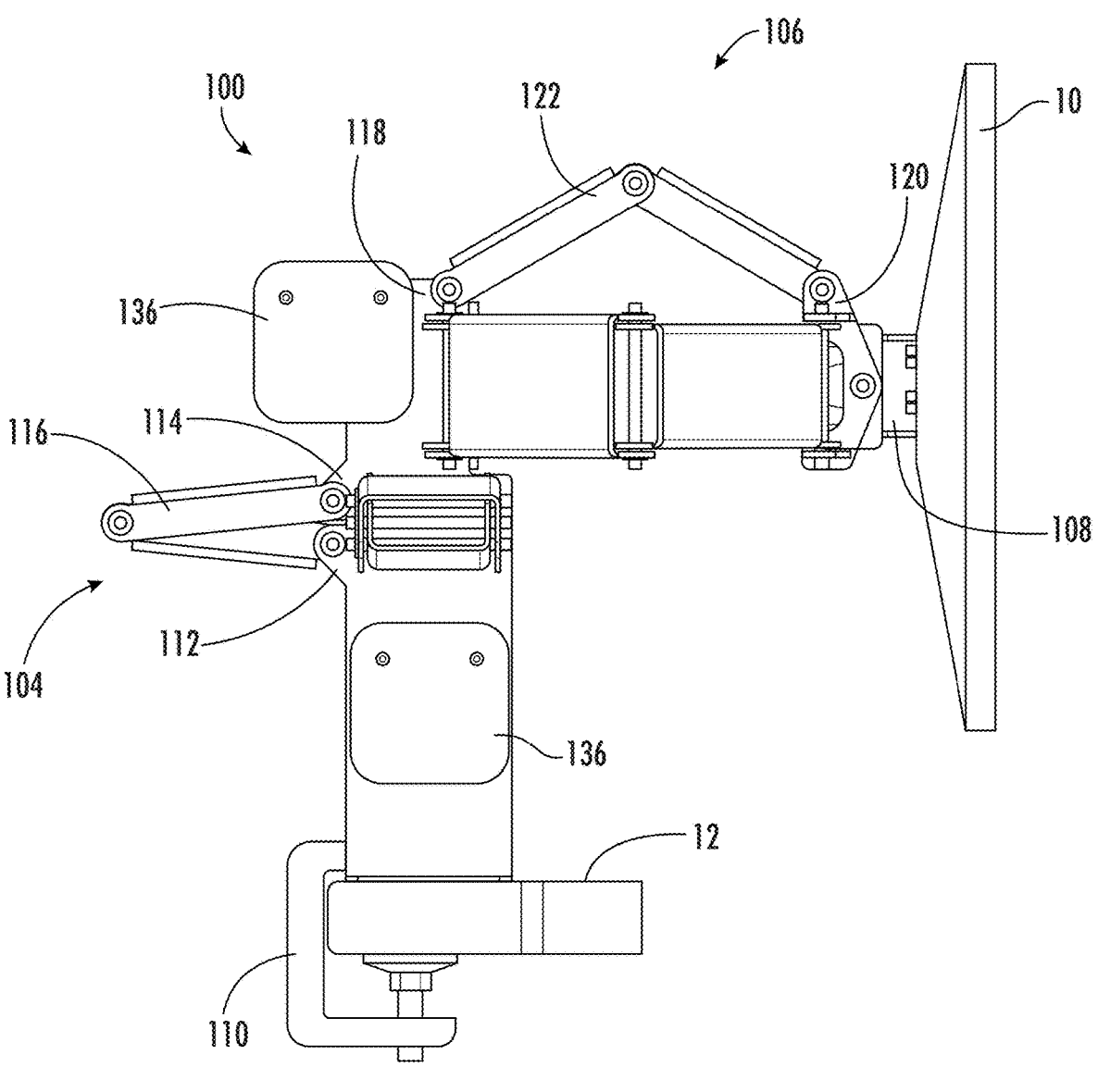
Figure 7:
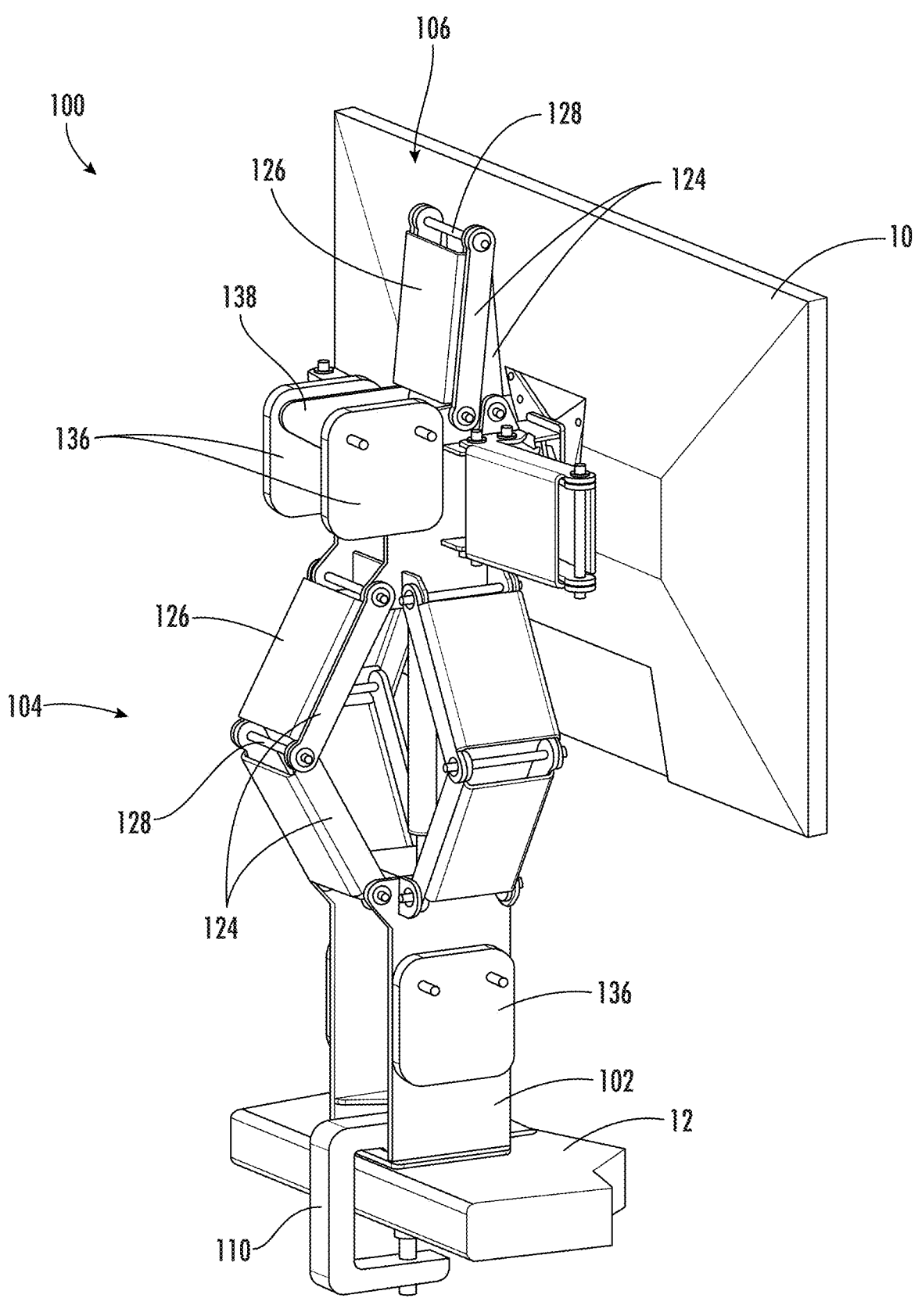
Figure 8:
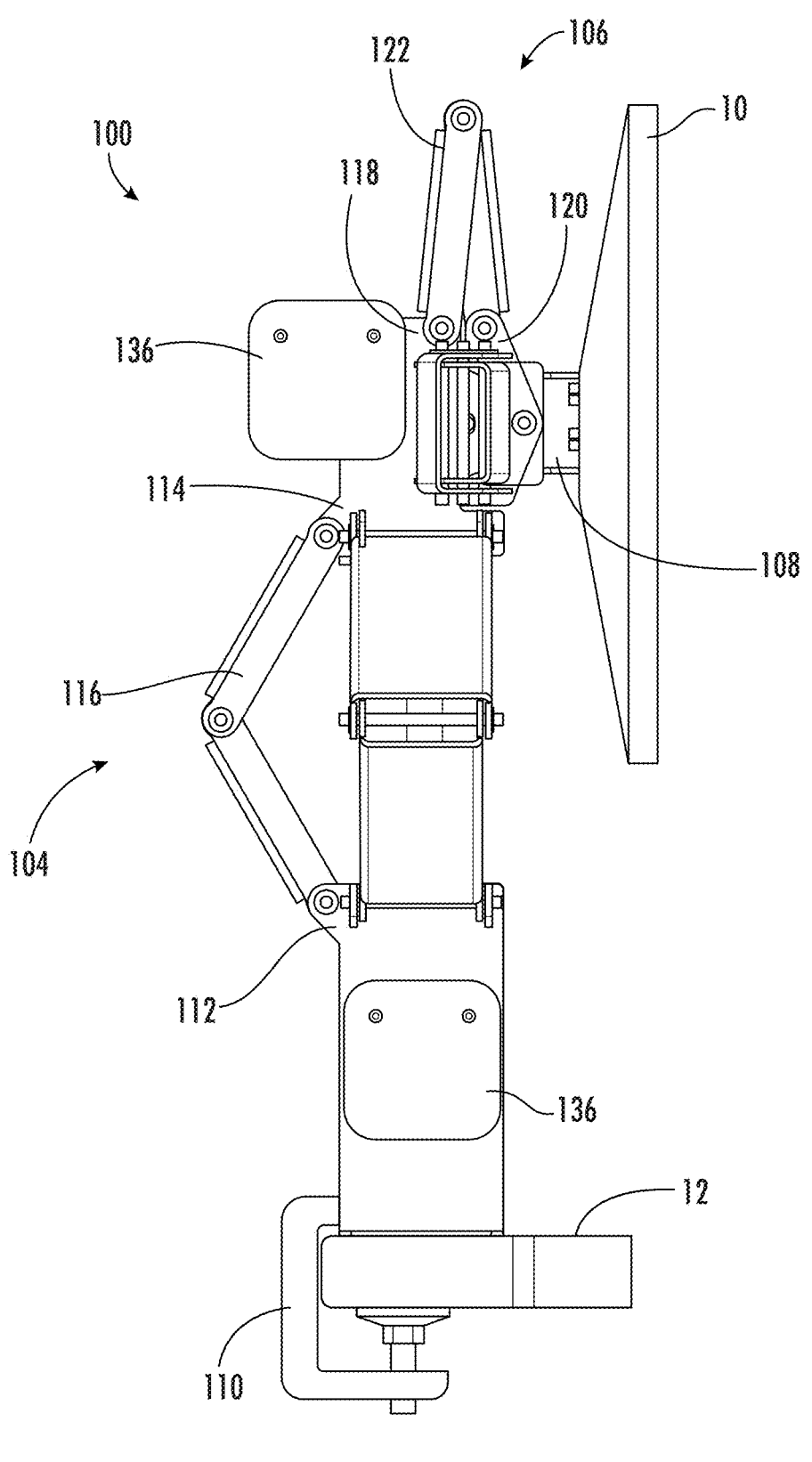
Figure 9:
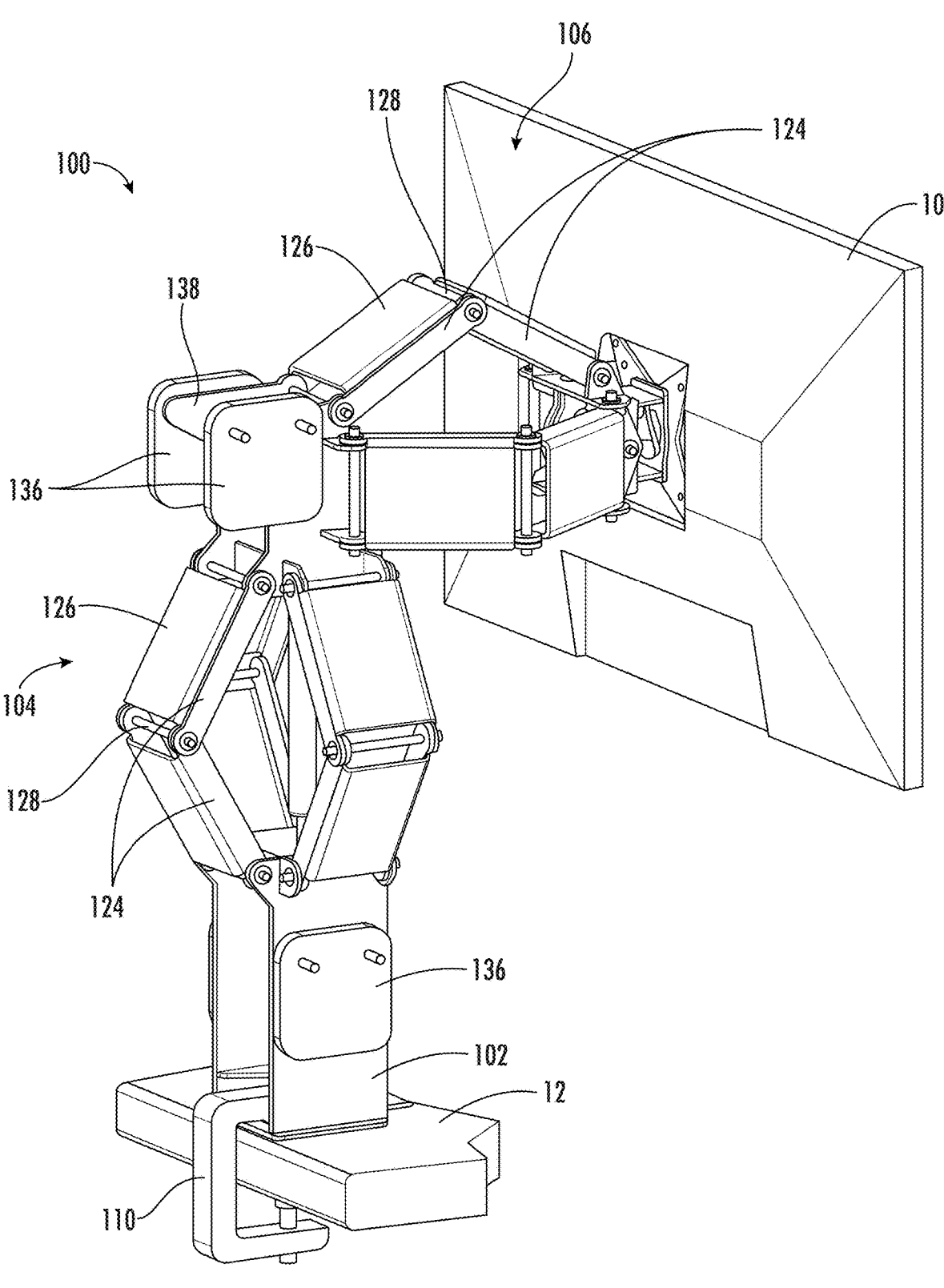
Figure 10:
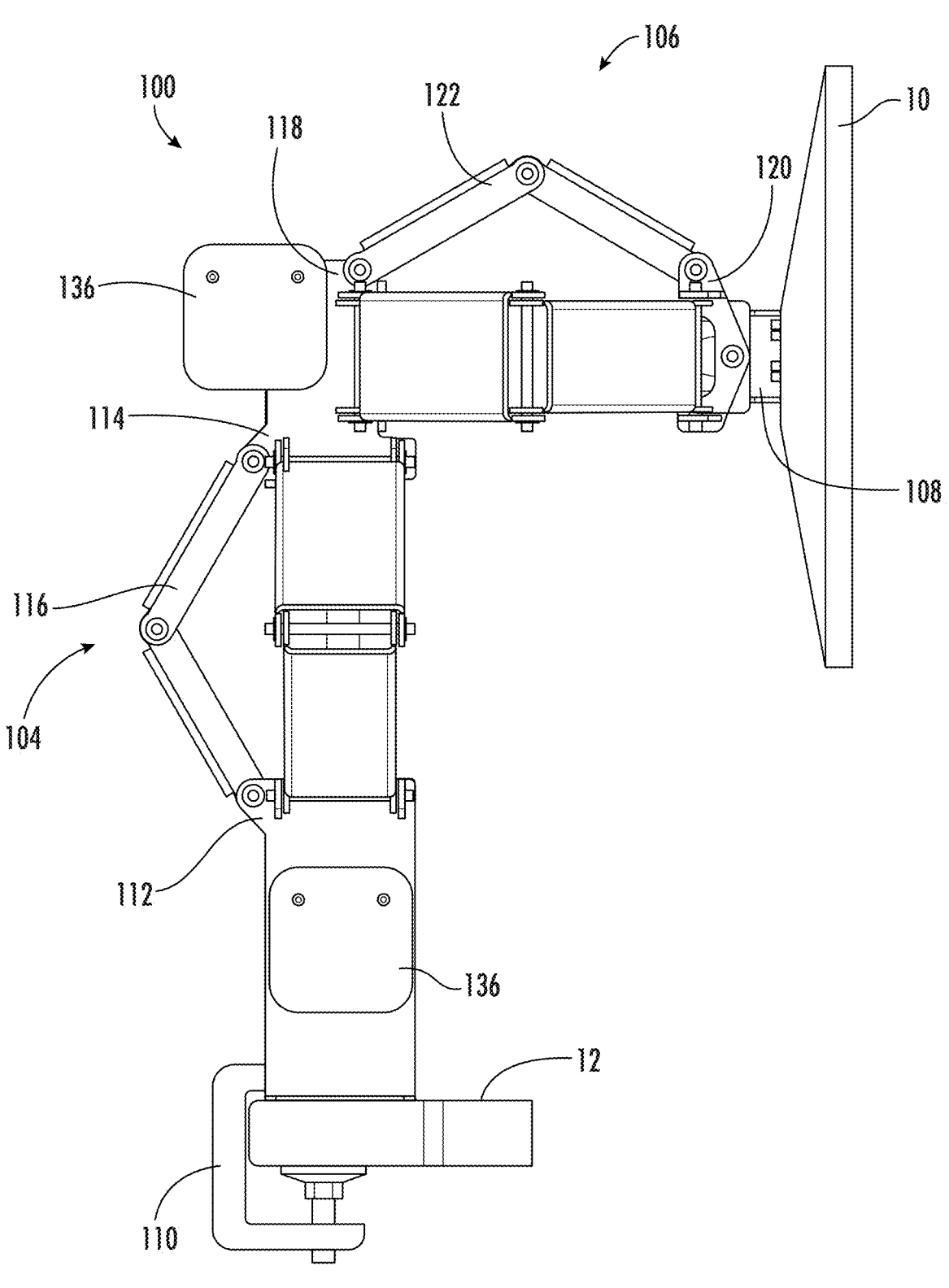
Figure 11:
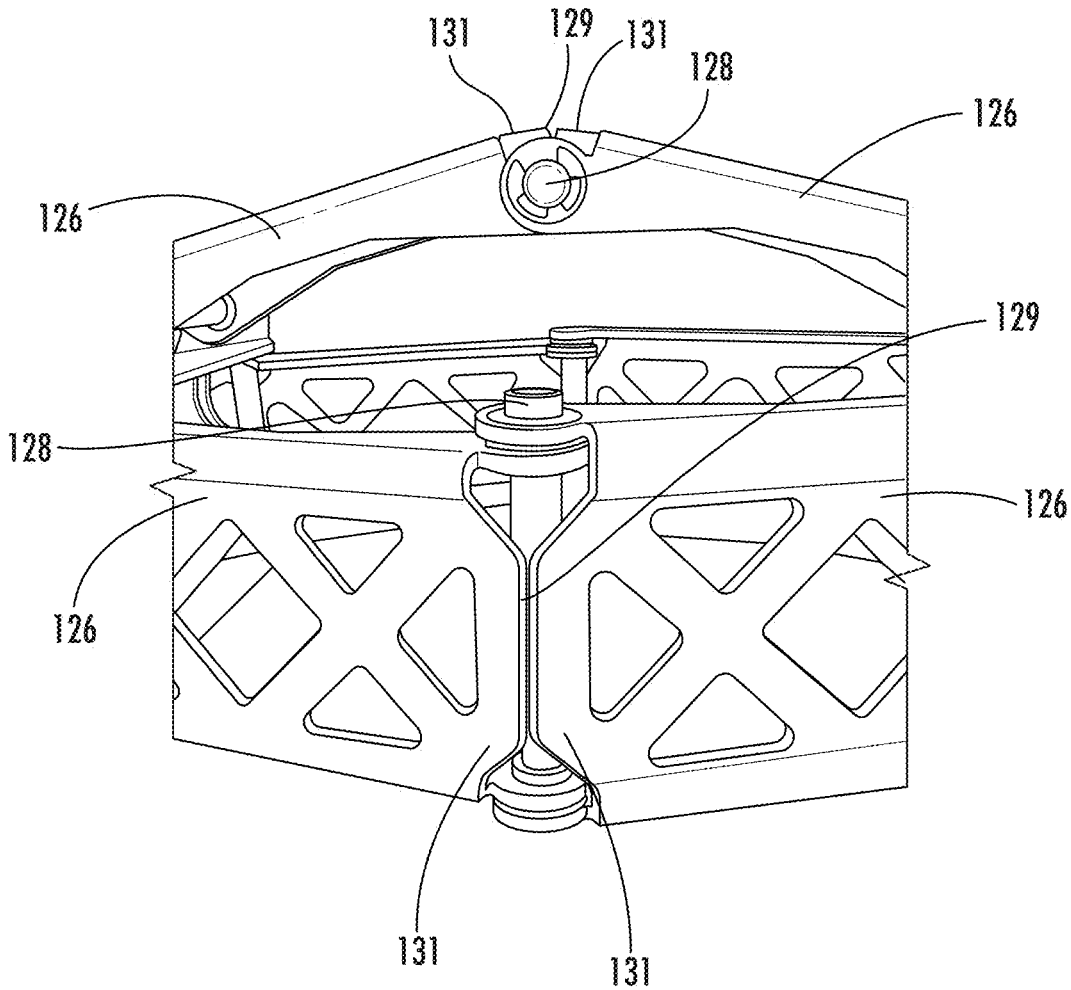
Figure 12:
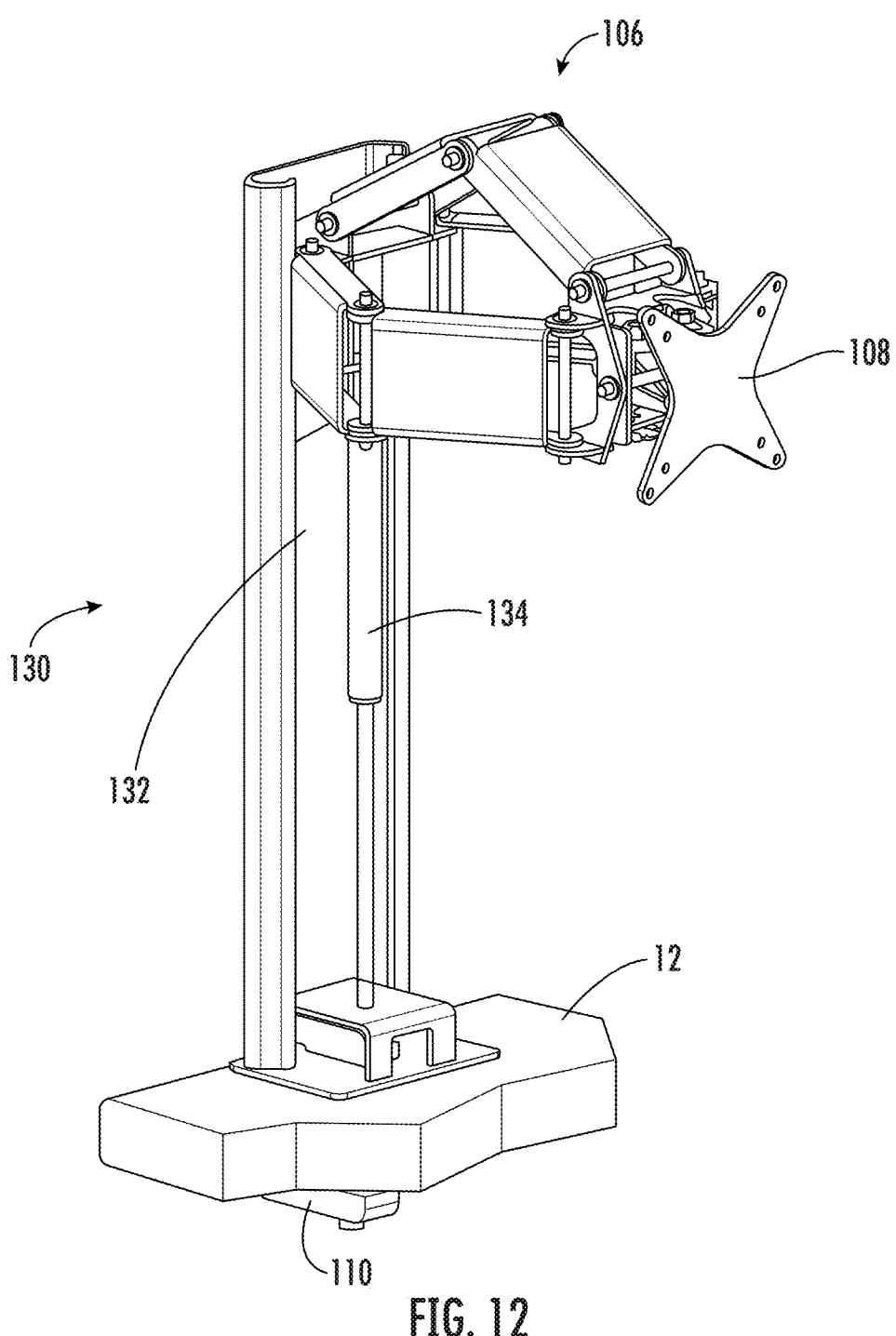
Figure 13:
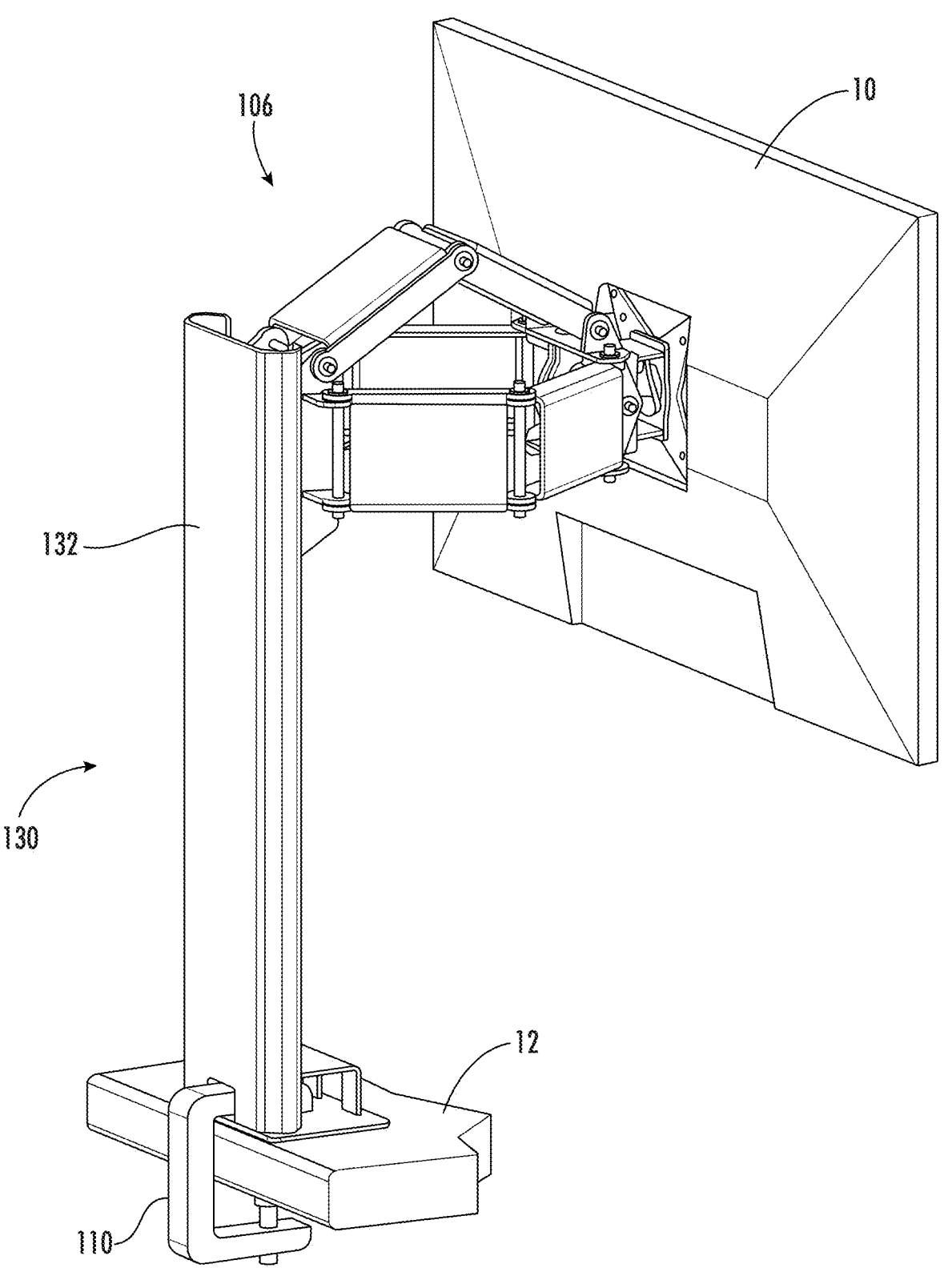
Figure 14:
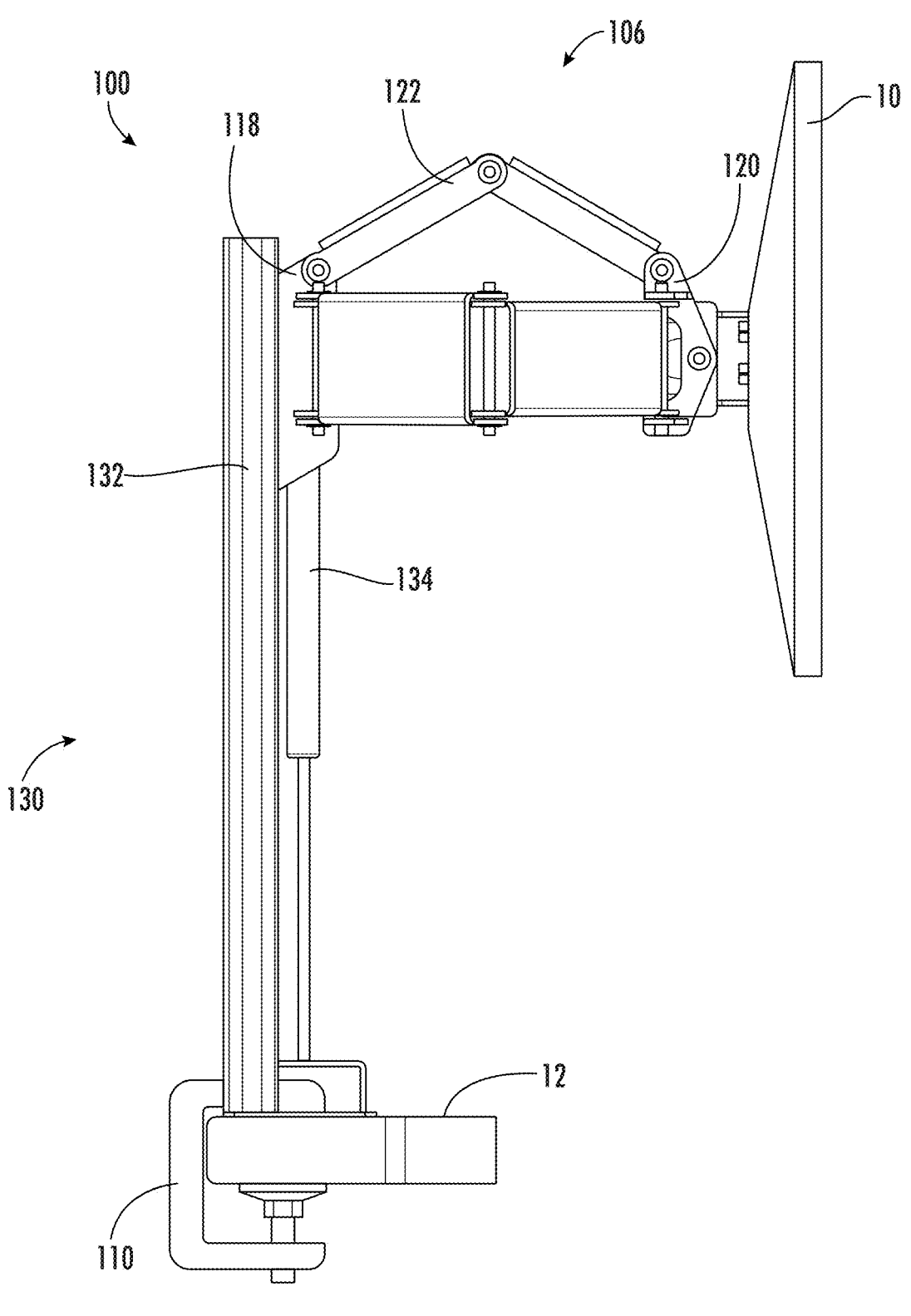
Figure 15:
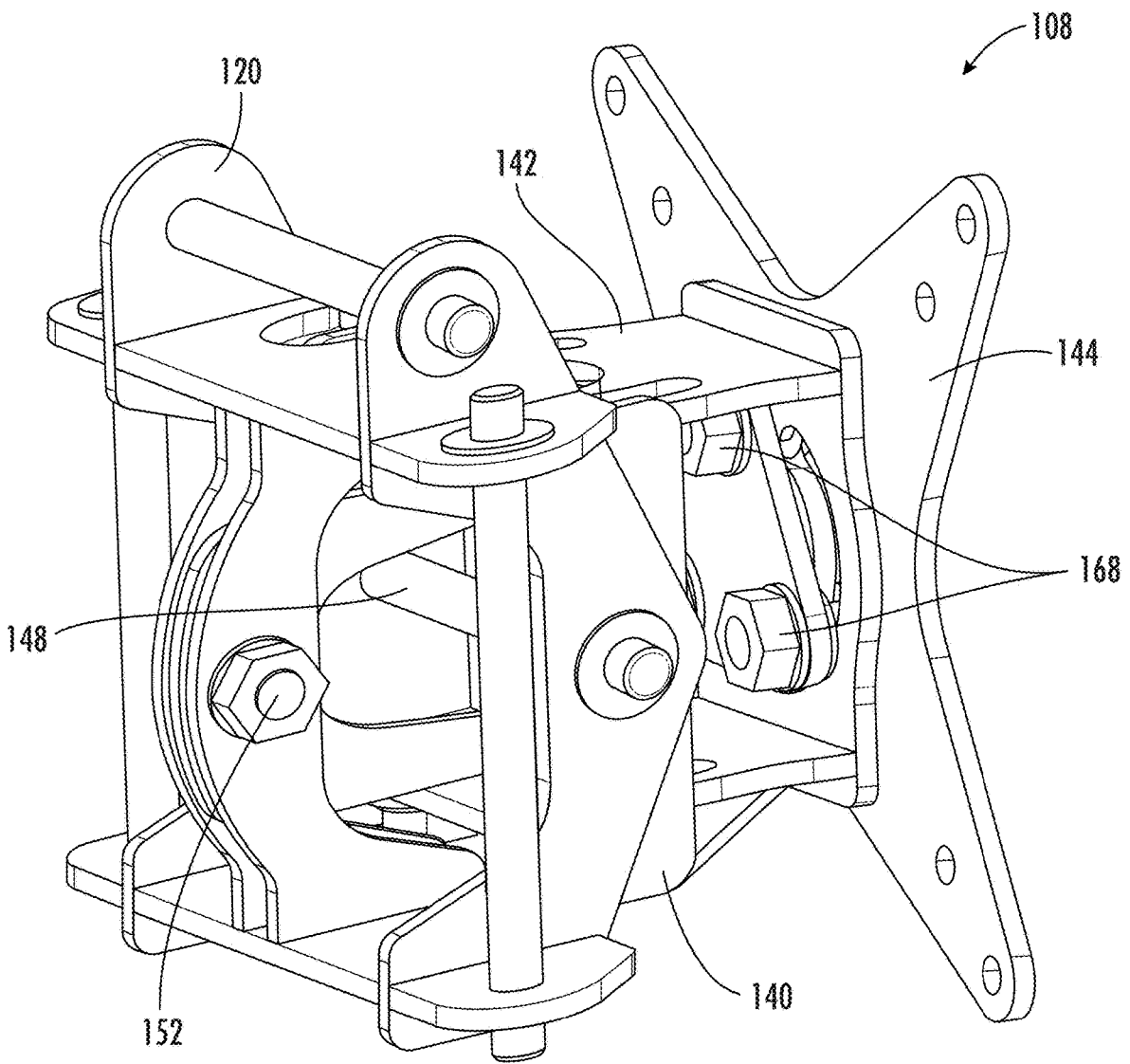
Figure 16:
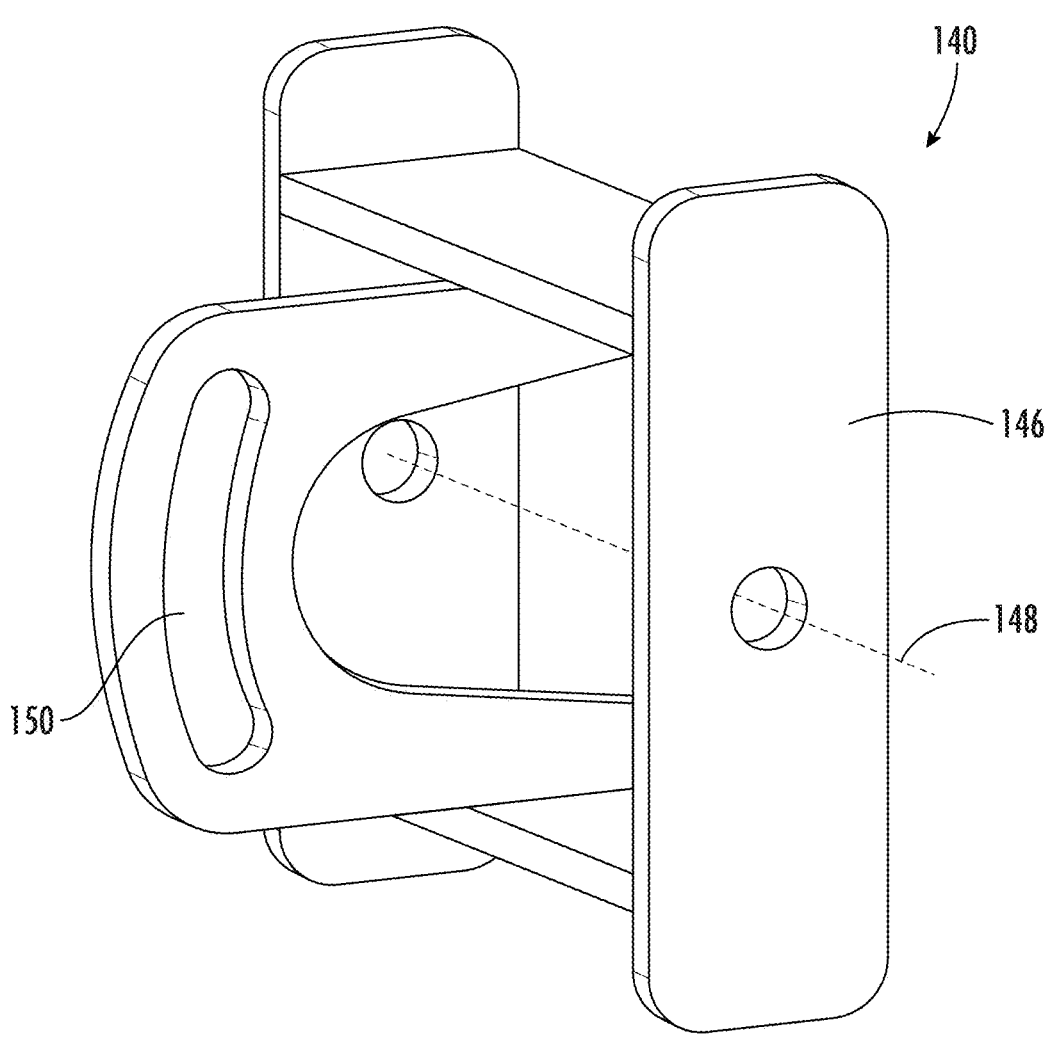
Figure 17:
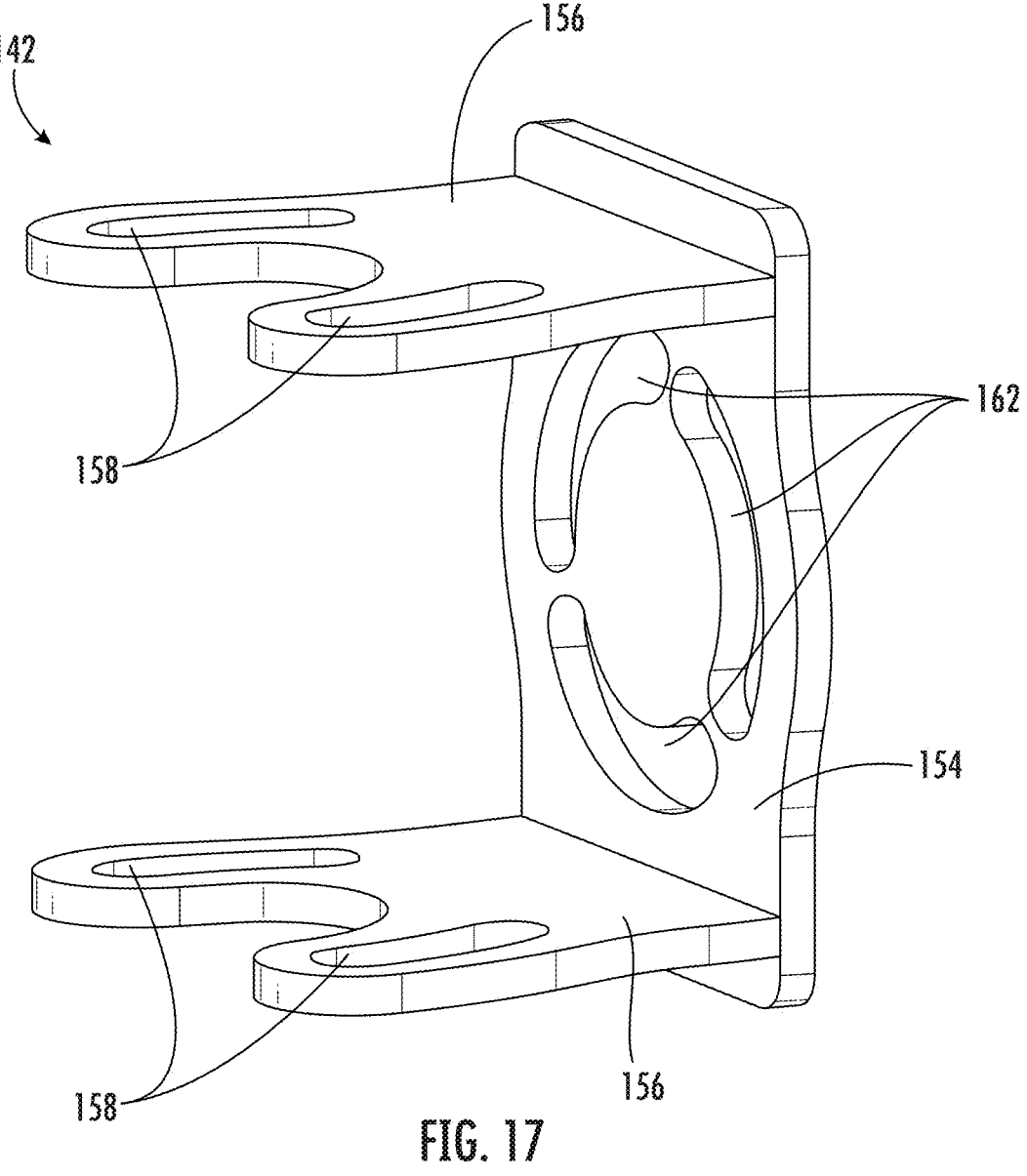
Figure 18:
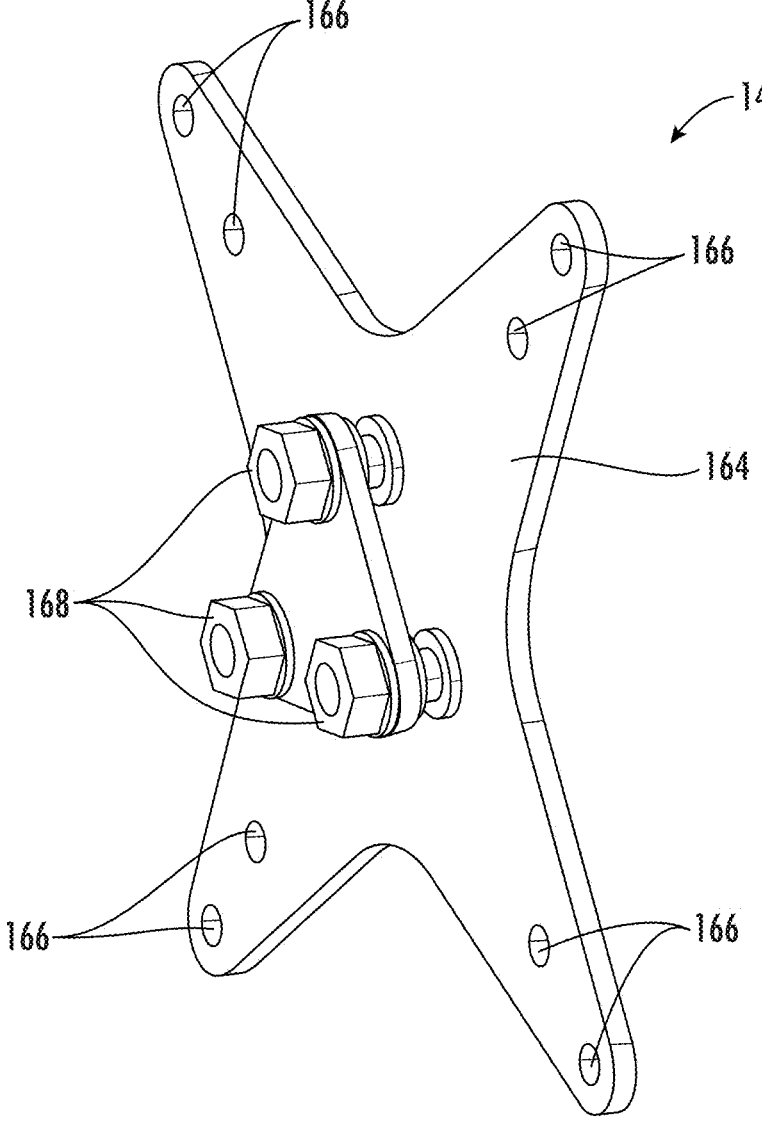
Figure 19:
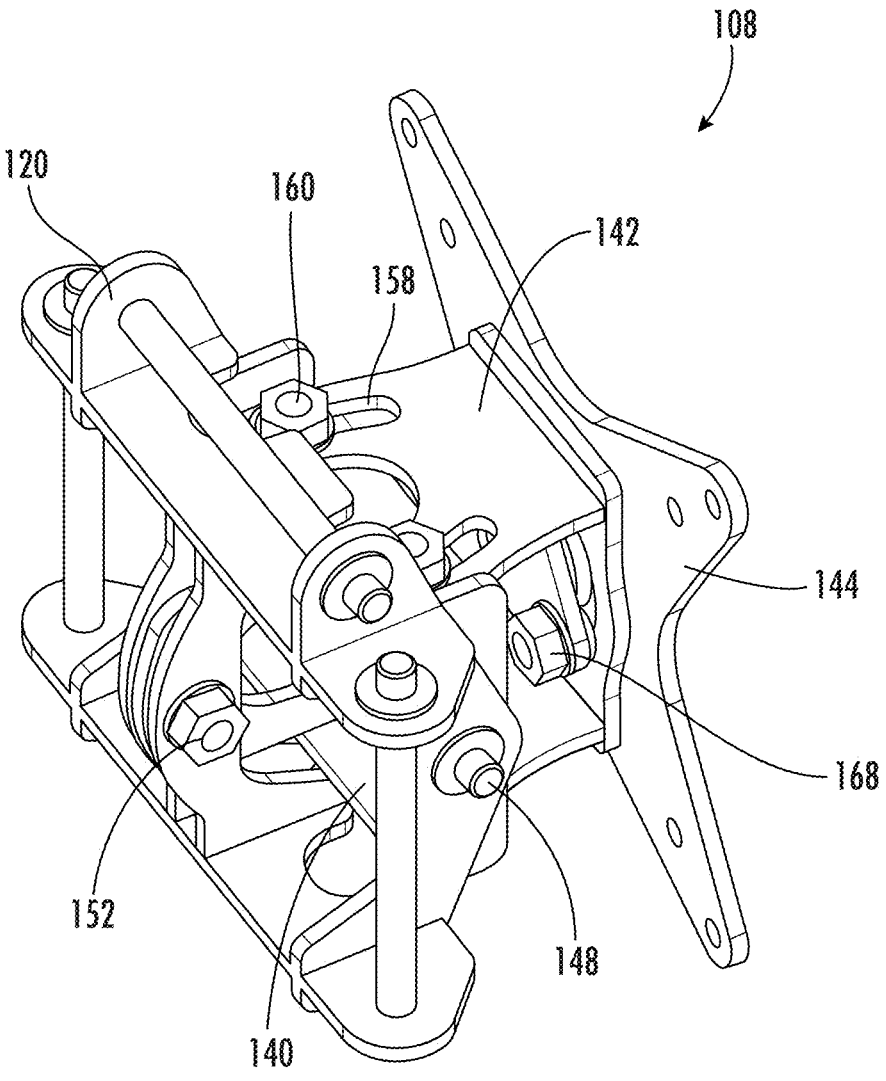
Figure 20:
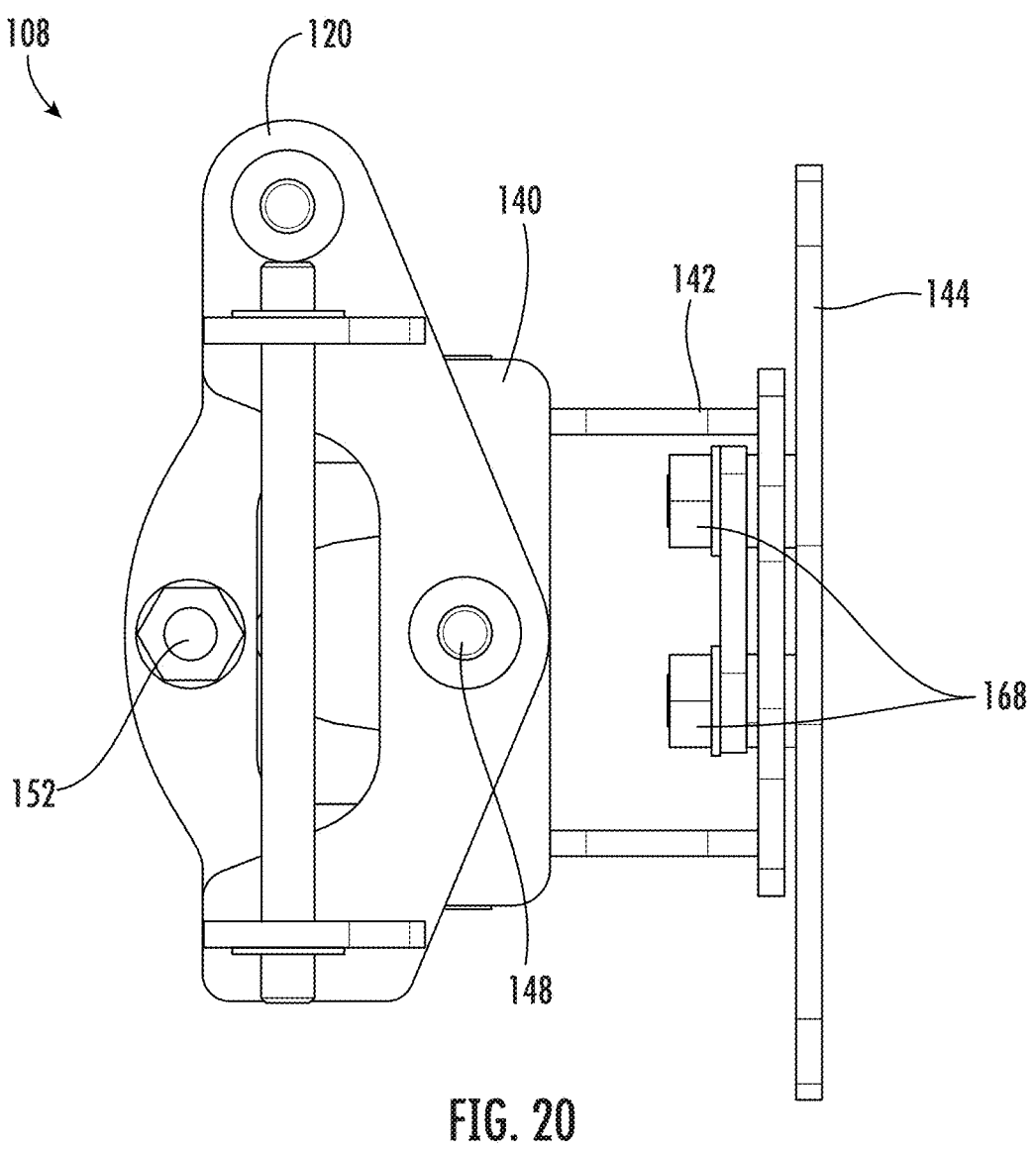
Figure 21:
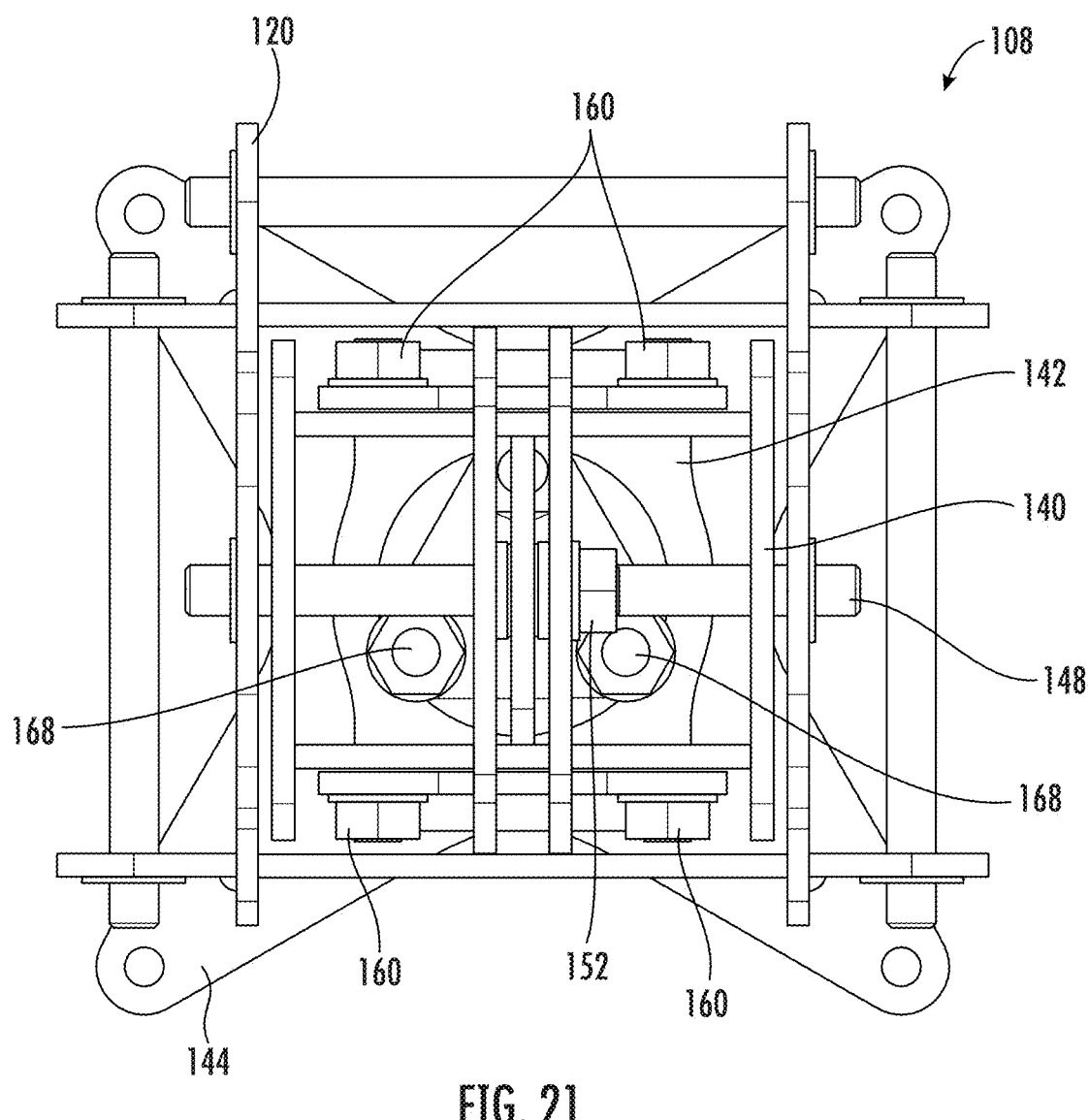
Figure 22:
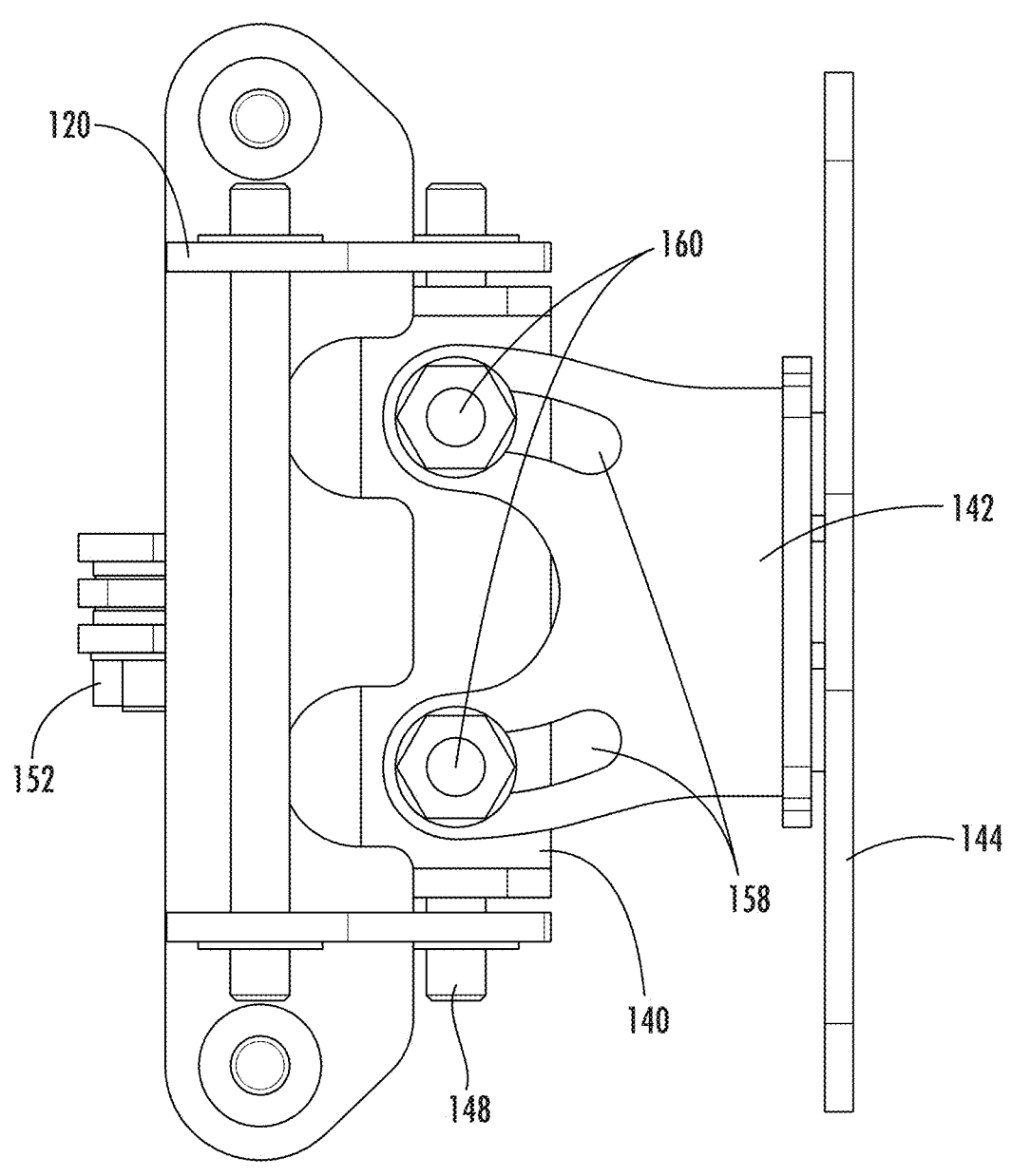
Figure 23:
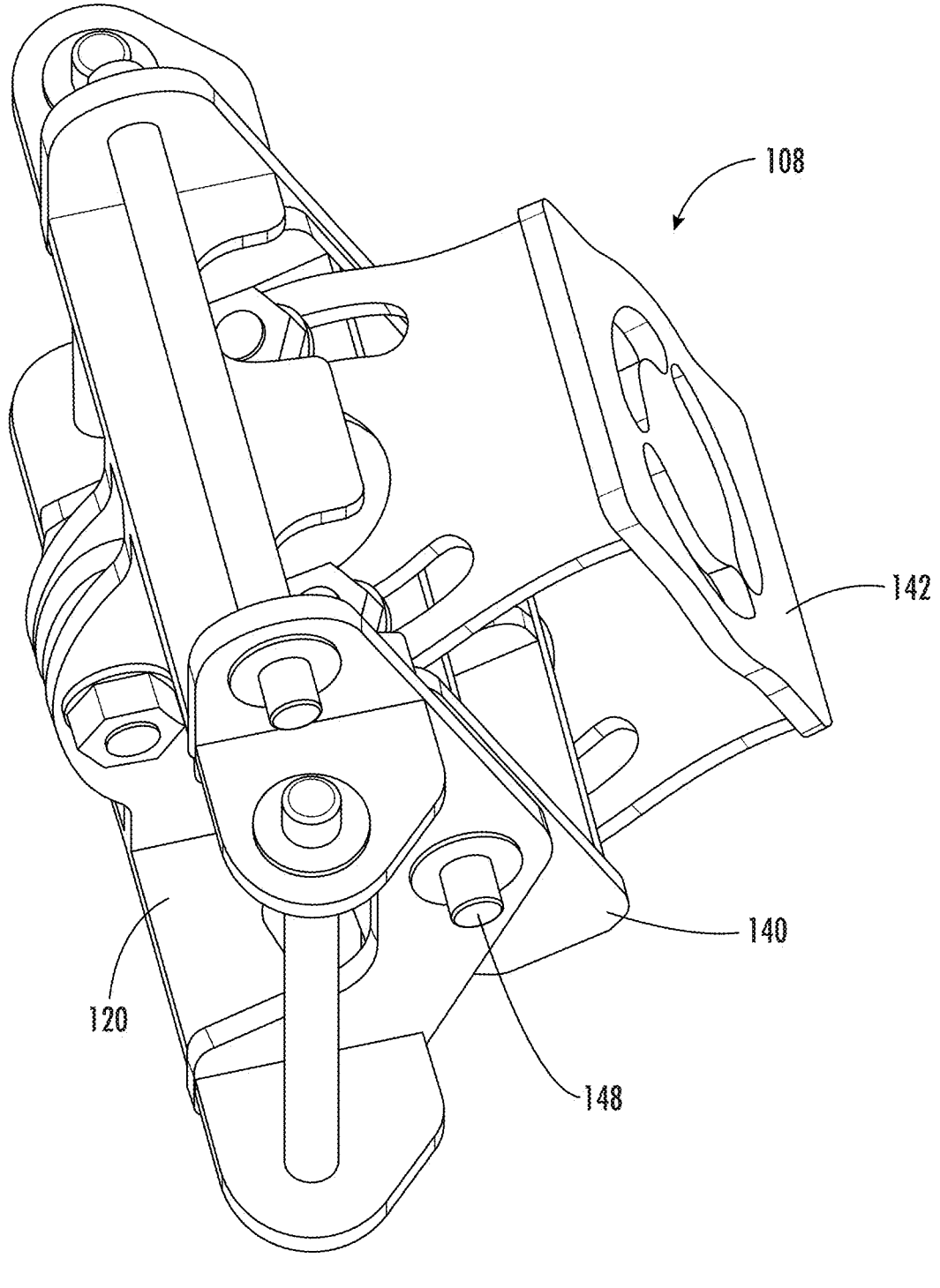
Figure 24:
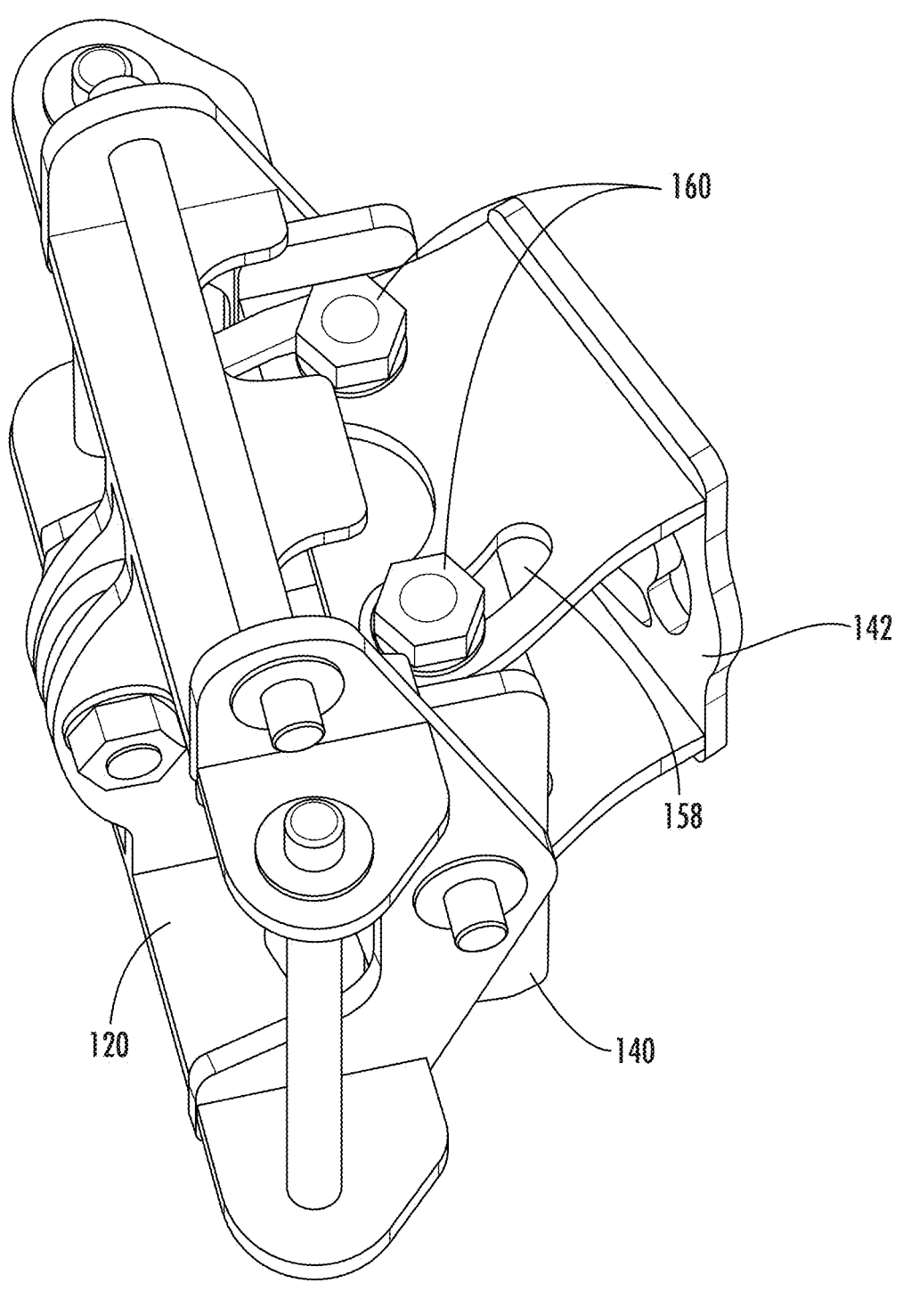

FIG. 1 is a front perspective view of a monitor stand according to some embodiments;

FIG. 2 is a rear perspective view of a monitor stand according to some embodiments;

FIG. 3 is perspective view of a monitor stand in a lowered, retracted position according to some embodiments;

FIG. 4 is a side view of a monitor stand in a lowered, retracted position according to some embodiments;

FIG. 5 is perspective view of a monitor stand in a lowered, extended position according to some embodiments;

FIG. 6 is a side view of a monitor stand in a lowered, extended position according to some embodiments;

FIG. 7 is perspective view of a monitor stand in a raised, retracted position according to some embodiments;

FIG. 8 is a side view of a monitor stand in a raised, retracted position according to some embodiments;

FIG. 9 is perspective view of a monitor stand in a raised, extended position according to some embodiments;

FIG. 10 is a side view of a monitor stand in a raised, extended position according to some embodiments;

FIG. 11 is a close-up view of a Sarrus linkage of a monitor stand according to some embodiments;

FIG. 12 is a perspective view of a monitor stand in a raised, extended position according to some embodiments;

FIG. 13 is a perspective view of a monitor stand in a raised, extended position according to some embodiments;

FIG. 14 is a side view of a monitor stand in a raised, extended position according to some embodiments;

FIG. 15 is a perspective view of a monitor mount of a monitor stand according to some embodiments;

FIG. 16 is a perspective view of a pitch bracket of a monitor mount of a monitor stand according to some embodiments;

FIG. 17 is a perspective view of a yaw bracket of a monitor mount of a monitor stand according to some embodiments;

FIG. 18 is a perspective view of a roll bracket of a monitor mount of a monitor stand according to some embodiments;

FIG. 19 is a perspective view of a monitor mount of a monitor stand according to some embodiments;

FIG. 20 is a side view of a monitor mount of a monitor stand according to some embodiments;

FIG. 21 is a rear view of a monitor mount of a monitor stand according to some embodiments;

FIG. 22 is a top view of a monitor mount of a monitor stand according to some embodiments;

FIG. 23 is a perspective view of a monitor mount of a monitor stand with the pitch bracket rotated according to some embodiments; and FIG. 24 is a perspective view of a monitor mount of a monitor stand with the yaw bracket rotated according to some embodiments.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The present disclosure is related to a monitor stand with adjustable height and reach. While some conventional monitor stands allow for height and reach adjustments, it is not possible to quickly and easily change the height or the forward position of the monitor without also changing the orientation of the monitor. This is primarily caused by the fact that conventional adjustable monitor stands provide this adjustability through angular articulations of the device's armature. Thus, all upward/downward and inward/outward motions are accompanied by unwanted rotation and/or tilt that tend to move the monitor out of alignment with the centerline of your desk/body and thus orient the monitor in the wrong direction. It is possible to wrestle the monitor back into alignment, but that requires the use of both hands and much additional force.

The present disclosure provides a monitor stand that allows the height and reach of the monitor to be quickly and easily adjusted without interfering with the monitor's rotation or tilt. This allows the user to frequently reposition the monitor for optimal viewing as needed. In some scenarios, the user needs to get physically closer to the screen of the monitor to examine small details, in particular for those with limited or failing eyesight. While leaning over the desk to get closer to the screen accomplishes this, doing so also contributes to bad head and neck posture. Thus, in addition to being easier to use, the presently disclosed monitor stand is better for good posture because the monitor can be moved closer to the user, rather than requiring the user to move closer to the monitor.

Thus, the present disclosure addresses limitations of conventional monitor stands by providing an innovative monitor stand with adjustable height and reach. The proposed design ensures smooth, precise adjustments, allowing users to achieve an ergonomically optimized setup with minimal effort. This solution caters to a wide range of users and work environments, enhancing both comfort and productivity.

The present disclosure is related to a monitor stand 100 configured to support a computer monitor 10. In some embodiments, including the embodiments illustrated in FIGS. 1-10, the monitor stand 100 comprises a base 102, a first linear motion stage 104, a second linear motion stage 106, and a monitor mount 108. The base 102, the first linear motion stage 104, the second linear motion stage 106, and the monitor mount 108 work together to provide the desired adjustability in two different directions without interfering with the orientation of the computer monitor 10 mounted to the monitor stand 100.

The base 102 is configured to mount to a horizontal surface 12, such as a desk or table. The base 102 is configured to secure the monitor stand 100 to the horizontal surface 12. Any securing method known in the art may be implemented. Thus, the base 102 may be mounted to the horizontal surface 12 using a mounting plate and/or any type of fastener. In some embodiments, the base 102 comprises a clamp 110 that is configured to hold the base 102 to the horizontal surface 12. Embodiments of the monitor stand 100 that include a base 102 with a clamp 110 have the benefit of being adaptable to any desk or table without requiring that a hole be cut through the desk or table because the clamp 110 can be attached to the desk or table from the side rather than passing through the desk or table, as shown in FIGS. 2 and 3.

The first linear motion stage 104 is attached to and extends away from the base 102. The first linear motion stage 104 comprises a first end 112 of the first linear motion stage 104, a second end 114 of the first linear motion stage 104, and a first linear guide 116 extending between the first end 112 of the first linear motion stage 104 and the second end 114 of the first linear motion stage 104.

The second linear motion stage 106 is attached to and extends away from the first linear motion stage 104. Like the first linear motion stage 104, the second linear motion stage 106 comprises a first end 118 of the second linear motion stage 106, a second end 120 of the second linear motion stage 106, and a second linear guide 122 extending between the first end 118 of the second linear motion stage 106 and the second end 120 of the second linear motion stage 106.

The first linear guide 116 is configured to enable linear motion of the second end 114 of the first linear motion stage 104 with respect to the first end 112 of the first linear motion stage 104 and the second linear guide 122 is configured to enable linear motion of the second end 120 of the second linear motion stage 106 with respect to the first end 118 of the second linear motion stage 106. Thus, when used together, the first linear motion stage 104 and the second linear motion stage 106 are configured to enable linear adjustment in two independent directions. For example, the first linear motion stage 104 and the second linear motion stage 106 may be implemented to enable adjustment in a vertical direction and in a horizontal direction, respectively. As will be apparent to one of skill in the art, these directions can be switched, with the first linear motion stage 104 enabling adjustment in the horizontal direction and the second linear motion stage 106 enabling adjustment in the vertical direction.

In some embodiments, the first end 118 of the second linear motion stage 106 is fixedly attached to the second end 114 of the first linear motion stage 104. Thus, when the first linear motion stage 104 is positionally adjusted, this moves the second linear motion stage 106 with the second end 114 of the first linear motion stage 104. Thus, as shown in FIGS. 3-10, the monitor stand 100 can be moved between a lowered position (FIGS. 3-6) and a raised position (FIGS. 7-10) and between a retracted position (FIGS. 3, 4, 7, and 8) and an extended position (FIGS. 5, 6, 9, and 10). In some embodiments, the first linear motion stage 104 and the second linear motion stage 106 are oriented perpendicular to each other. In such embodiments, the motion of the monitor stand 100 in the vertical direction and the motion in the horizontal direction are independent of each other.

In some embodiments, the monitor mount 108 is fixedly coupled to the second end 120 of the second linear motion stage 106. The monitor mount 108 is configured to attach to and support a computer monitor 10. In this way, the computer monitor 10 can be adjusted to a desired position by adjusting the first linear motion stage 104 and the second linear motion stage 106. For example, in some embodiments, the first linear guide 116 is configured to enable adjustment of a first position of the monitor mount 108 with respect to the base 102 in a first direction, such as a vertical or horizontal direction and the second linear guide 122 is configured to enable adjustment of a second position of the monitor mount 108 with respect to the base 102 in a second direction that is different from the first direction. In some embodiments, the second direction may be perpendicular to the first direction. Thus, if the first direction is a vertical direction, as shown in FIGS. 3-10, then the second direction may be a horizontal direction.

In some embodiments, the first linear guide 116 and/or the second linear guide 122 is a Sarrus linkage. The Sarrus linkage is configured to enable linear motion without a reference guideway. The Sarrus linkage may comprise a plurality of pairs of links 124. Each of the plurality of pairs of links 124 may comprise two rigid plates 126 coupled together with a hinge 128. In some embodiments, the Sarrus linkage comprises three pairs of links 124, but other quantities can also function well. In particular embodiments, additional stability is provided by having at least one of the plurality of pairs of links 124 with a hinge 128 that is nonparallel to a hinge 128 of another of the plurality of pairs of links 124. This stabilizes the Sarrus linkage by constraining the motion of the ends of the Sarrus linkage to remain parallel with each other, thus enabling the linear motion of the Sarrus linkage.

In some embodiments, the first linear guide 116 and/or the second linear guide 122 are unpowered and are configured to be manually positioned. In some embodiments, the second linear guide 122 is a horizontal Sarrus linkage and is configured to move the computer monitor 10 between the retracted position and the extended position. In some embodiments, the first linear guide 116 is a vertical Sarrus linkage and is configured to move the computer monitor 10 between the lowered position and the raised position. In some embodiments, the implementation of a Sarrus linkage for the first linear motion stage 104 and/or the second linear motion stage 106 is beneficial because the Sarrus linkage takes up very little space when retracted or compressed. When a Sarrus linkage is implemented for the first linear motion stage 104 and/or the second linear motion stage 106, the Sarrus linkage may have a physical stop 129 configured to prevent the Sarrus linkage from extending to the point that the individual links 124 in each pair of links 124 rotate into parallel with each other. In some embodiments, this physical stop 129 is created by including an extension 131 on each or one of the plates 126, as shown in FIG. 11, such that as the Sarrus linkage moves towards the extended position or raised position, the plates 126 make contact with each other before becoming parallel, thus stopping rotation. This helps to prevent the Sarrus linkage from locking up or over rotating to where the links 124 extend inward instead of outward. Thus, the two rigid plates 126 of each of the plurality of pairs of links 124 may be configured to remain nonparallel to each other.

In some embodiments, the first linear guide 116 or the second linear guide 122 may be another type of linear motion mechanism, including a bearing carriage and guide rail, a roller carriage and guide rail, a telescoping rail, a linear ball bearing, a track roller and guide rail, etc. In other words, the first linear guide 116 and the second linear guide 122 may be any linear motion mechanism, including any guide and track combination. As shown in FIGS. 12-14, the first linear motion stage 104 may be replaced by a first linear motion stage 130, which may have any of the features discussed above regarding the first linear motion stage 104. In some embodiments, the first linear motion stage 130 comprises a vertical track 132. The second linear motion stage 106 may be slidably coupled to the vertical track 132 of the first linear motion stage 130 and may be configured to slide up and down along the vertical track 132 with respect to the base 102.

In some embodiments, the monitor stand 100 also comprises a spring 134 extending between the ends of either the first linear motion stage 104 or the second linear motion stage 106, depending on which of the two is oriented in a direction that requires overcoming the weight of the monitor stand 100 to be raised upward. Thus, in some embodiments, the spring 134 extends between the first end 112 and the second end 114 of the first linear motion stage 104. The spring 134 is configured to exert an upward force and counteract a weight of at least the monitor mount 108 and the computer monitor 10. In some embodiments, the spring 134 is also configured to counteract the weight of the second linear motion stage 106. In some embodiments, the spring 134 is a gas spring and may provide a substantially constant force throughout the motion of the linear motion stage to which it is attached. This is beneficial because if the force exerted by the spring 134 is equal to the weight of the monitor stand 100 supported by the spring 134, the monitor stand 100 can be moved to any position ranging from the lowered position to the raised position and left at that position without locking the monitor stand 100 in place and the monitor stand 100 will remain in that position until adjusted at a later time. In some embodiments, the spring 134 is configured with upward force that is capable of lifting the heaviest possible computer monitor 10. This is to ensure that, regardless of the monitor 10 used, the spring 134 will be able to lift it.

The monitor stand 100 may be counterweighted to balance the upward force of the spring 134 with the weight of the monitor stand 100 supported by the spring 134. In some embodiments, to aid in balancing the force of the spring 134 with the weight of the monitor stand 100 supported by the spring 134, the monitor stand 100 may comprise a plurality of counterweights 136. The plurality of counterweights 136 is configured to enable a user to add weight to the monitor stand 100 above the spring 134 to balance the weight of the monitor stand 100 supported by the spring 134 with the upward force of the spring 134. The plurality of counterweights 136 may be all the same weight or may have a variety of different weights. In some embodiments, the monitor stand 100 has hangers 138 positioned above the first linear motion stage 104 adjacent to the second linear motion stage 106 and below the first linear motion stage 104 on the base 102. The hangers 138 are configured to support the plurality of counterweights 136. The user can thus move the plurality of counterweights 136 to different hangers 138 on the monitor stand 100 to balance the weight of the monitor stand 100 supported by the spring 134 with the force of the spring 134. Other systems of counterweighting the monitor stand 100 may also be implemented.

In some embodiments, the monitor mount 108 is configured to enable rotation of the computer monitor 10 about three independent axes. The monitor mount 108 may also be configured to enable rotation of the computer monitor 10 about less than three independent axes, such as two independent axes or one independent axis. The monitor mount 108 may comprise a pitch bracket 140, a yaw bracket 142, and/or a roll bracket 144, as shown in FIGS. 15-24. Each of these brackets enable rotation of the computer monitor 10 with respect to the monitor stand 100 about a different axis.

As shown in FIG. 16, in some embodiments, the pitch bracket 140 has a frame 146. The frame 146 may be rectangular. The pitch bracket 140 may also have a pivot axis 148 and a curved pitch slot 150. The pitch bracket 140 may be configured to rotatably couple to the second end 120 of the second linear motion stage 106 and may be configured to rotate with respect to the second end 120 of the second linear motion stage 106 about the pivot axis 148. To control this rotation and prevent unlimited rotation, the pitch bracket 140 may also be coupled to the second end 120 of the 106 through the curved pitch slot 150. For example, a pin 152 attached to the second end 120 of the second linear motion stage 106 may extend through the curved pitch slot 150. The curved pitch slot 150 may be curved to have a constant distance from each point along the curved pitch slot 150 to the pivot axis 148. Thus, when the pitch bracket 140 is rotated with respect to the second end 120 of the second linear motion stage 106, the pin 152 travels along the curved pitch slot 150. In some embodiments, the pin 152 may be threaded and may be tightened to increase the friction between the pitch bracket 140 and the second linear motion stage 106, thus "locking" the rotation of the pitch bracket 140 with respect to the second linear motion stage 106, or loosened to make it easier to rotate the pitch bracket 140 with respect to the second linear motion stage 106. In this way, the force required to rotate the pitch bracket 140 can be adjusted. In some embodiments, the pitch bracket 140 is configured to allow the computer monitor 10 to tilt up and down, thus allowing the user to orient the computer monitor 10 more upward or more downward, as shown in FIG. 23.

As shown in FIG. 17, in some embodiments, the yaw bracket 142 has a plate 154 and at least one arm 156 extending away from the plate 154. The at least one arm 156 may have a plurality of curved yaw slots 158. A plurality of pins 160 attached to the frame 146 of the pitch bracket 140 may be slidably coupled with the plurality of curved yaw slots 158 of the at least one arm 156. Each of the plurality of curved yaw slots 158 may have a common center of rotation, thus allowing the yaw bracket 142 to rotate with respect to the pitch bracket 140 by rotating the yaw bracket 142 about the center of rotation of the plurality of curved yaw slots 158. The rotation of the yaw bracket 142 may be perpendicular to the rotation of the pitch bracket 140. In some embodiments, the plurality of pins 160 may be threaded and may be tightened to increase the friction between the yaw bracket 142 and the pitch bracket 140, thus "locking" the rotation of the yaw bracket 142 with respect to the pitch bracket 140, or loosened to make it easier to rotate the yaw bracket 142 with respect to the pitch bracket 140. In this way, the force required to rotate the yaw bracket 142 can be adjusted. In some embodiments, the plate 154 has a plurality of curved roll slots 162 that have a common center of rotation. In some embodiments, the yaw bracket 142 is configured to allow the computer monitor 10 to turn to the left and right, thus allowing the user to orient the computer monitor 10 to either side, as shown in FIG. 24.

As shown in FIG. 18, in some embodiments, the roll bracket 144 is formed as a plate 164 with a plurality of screw holes 166 extending therethrough. The roll bracket 144 is configured to fixedly attach to the computer monitor 10 such that no rotation occurs between the roll bracket 144 and the computer monitor 10. The roll bracket 144 also has a plurality of roll pins 168 configured to slidably couple with the plurality of curved roll slots 162 of the yaw bracket 142. The plurality of roll pins 168 of the roll bracket 144 and the plurality of curved roll slots 162 of the yaw bracket 142 allow the roll bracket 144 to rotate with respect to the yaw bracket 142 by rotating the roll bracket 144 about the center of rotation of the plurality of curved roll slots 162. The rotation of the roll bracket 144 may be perpendicular to the rotation of the pitch bracket 140 and the rotation of the yaw bracket 142. In some embodiments, the plurality of roll pins 168 may be threaded and may be tightened to increase the friction between the roll bracket 144 and the yaw bracket 142, thus "locking" the rotation of the roll bracket 144 with respect to the yaw bracket 142, or loosened to make it easier to rotate the roll bracket 144 with respect to the yaw bracket 142. In this way, the force required to rotate the roll bracket 144 can be adjusted. In some embodiments, the roll bracket 144 is configured to allow the computer monitor 10 to rotate in a direction perpendicular to the screen of the computer monitor 10, thus allowing the user to orient the computer monitor 10 between a landscape position and a portrait position.

As will be apparent to one of skill in the art, the individual components of the monitor mount 108 may be adjusted to reduce the number of degrees of freedom. For example, in an embodiment that excludes the pitch bracket 140, it is apparent to one of skill in the art how to adjust the yaw bracket 142 to attach directly to the second linear motion stage 106 instead of to the pitch bracket 140 as described above. The present disclosure therefore is related to embodiments that exclude one or more of the components described above with respect to the monitor mount 108 and any specific methods of assembling the monitor mount 108 together may be adjusted to reflect this change in components.

The present disclosure provides a monitor stand 100 that has linearly adjustable height and reach, as described above. By providing linearly adjustable height and reach, the position of the computer monitor 10 can be adjusted without changing the orientation of the computer monitor 10, thus making adjustments easier, faster, and more efficient. In addition, the present disclosure is related to a monitor mount 108 with ability to be rotated in three independent directions, thus facilitating orienting the computer monitor 10 where desired.

Many additional implementations are possible. Further implementations are within the CLAIMS.

It will be understood that implementations of the monitor stand include but are not limited to the specific components disclosed herein, as virtually any components consistent with the intended operation of various monitor stands may be utilized. Accordingly, for example, it should be understood that, while the drawings and accompanying text show and describe particular monitor stand implementations, any such implementation may comprise any shape, size, style, type, model, version, class, grade, measurement, concentration, material, weight, quantity, and/or the like consistent with the intended operation of monitor stands.

The concepts disclosed herein are not limited to the specific monitor stand shown herein. For example, it is specifically contemplated that the components included in particular monitor stands may be formed of any of many different types of materials or combinations that can readily be formed into shaped objects and that are consistent with the intended operation of the monitor stand. For example, the components may be formed of: rubbers (synthetic and/or natural) and/or other like materials; glasses (such as fiberglass), carbon-fiber, aramid-fiber, any combination therefore, and/or other like materials; elastomers and/or other like materials; polymers such as thermoplastics (such as ABS, fluoropolymers, polyacetal, polyamide, polycarbonate, polyethylene, polysulfone, and/or the like, thermosets (such as epoxy, phenolic resin, polyimide, polyurethane, and/or the like), and/or other like materials; plastics and/or other like materials; composites and/or other like materials; metals, such as zinc, magnesium, titanium, copper, iron, steel, carbon steel, alloy steel, tool steel, stainless steel, spring steel, aluminum, and/or other like materials; and/or any combination of the foregoing.

Furthermore, monitor stands may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular monitor stand implementations, it should be readily apparent that a number of modifications may be made without departing from the spirit thereof and that these implementations may be applied to other implementations disclosed or undisclosed. The presently disclosed monitor stands are, therefore, to be considered in all respects as illustrative and not restrictive.

I claim:

1. A monitor stand, comprising:
a base configured to mount to a horizontal surface;
a first linear motion stage attached to and extending upward from the base, the first linear motion stage comprising a first end of the first linear motion stage fixedly attached to the base, a second end of the first linear motion stage positioned above the first end of the first linear motion stage, and a vertical Sarrus linkage extending between the first end of the first linear motion stage and the second end of the first linear motion stage, the vertical Sarrus linkage having a plurality of pairs of links joining the first end of the first linear motion stage to the second end of the first linear motion stage in parallel, each of the plurality of pairs of links comprising two rigid plates coupled together with a hinge;
a second linear motion stage attached to and extending forward from the first linear motion stage, the second linear motion stage comprising a first end of the second linear motion stage fixedly attached to the second end of the first linear motion stage, a second end of the second linear motion stage positioned forward from the first end of the second linear motion stage, and a horizontal Sarrus linkage extending between the first end of the second linear motion stage and the second end of the second linear motion stage, the horizontal Sarrus linkage having a plurality of pairs of links joining the first end of the second linear motion stage to the second end of the second linear motion stage in parallel, each of the plurality of pairs of links comprising two rigid plates coupled together with a hinge;
a monitor mount fixedly coupled to the second end of the second linear motion stage and configured to attach to and support a computer monitor; and
a spring extending between the first end of the first linear motion stage and the second end of the first linear motion stage, wherein the spring is configured to exert an upward force on the second end of the first linear motion stage and counteract a weight of at least the second linear motion stage, the monitor mount, and the computer monitor;
wherein the vertical Sarrus linkage is configured to enable adjustment of a vertical position of the monitor mount with respect to the base; and wherein the horizontal Sarrus linkage is configured to enable adjustment of a horizontal position of the monitor mount with respect to the base.

2. The monitor stand of claim 1, wherein the spring is a gas spring.

3. The monitor stand of claim 1, further comprising a plurality of counterweights configured to enable a user to add weight to the monitor stand above the spring to balance the weight of at least the second linear motion stage, the monitor mount, and the computer monitor with the upward force of the spring.

4. The monitor stand of claim 1, wherein the monitor mount is configured to enable rotation of the computer monitor about three independent axes.

5. The monitor stand of claim 1, wherein the base comprises a clamp configured to hold the base to the horizontal surface.

6. The monitor stand of claim 1, wherein the two rigid plates of each of the plurality of pairs of links are configured to remain nonparallel to each other.

7. A monitor stand, comprising:
a base configured to mount to a horizontal surface;
a first linear motion stage attached to and extending away from the base, the first linear motion stage comprising a first end of the first linear motion stage fixedly attached to the base, a second end of the first linear motion stage, and a first linear guide extending between the first end of the first linear motion stage and the second end of the first linear motion stage;
a second linear motion stage attached to and extending away from the first linear motion stage, the second linear motion stage comprising a first end of the second linear motion stage fixedly attached to the second end of the first linear motion stage, a second end of the second linear motion stage, and a second linear guide extending between the first end of the second linear motion stage and the second end of the second linear motion stage;
a monitor mount fixedly coupled to the second end of the second linear motion stage and configured to attach to and support a computer monitor; and
a spring extending between the first end of one of the first linear motion stage and the second linear motion stage and the second end of the one of the first linear motion stage and the second linear motion stage, wherein the spring is configured to exert an upward force and counteract a weight of at least the monitor mount and the computer monitor;
wherein the first linear guide is configured to enable adjustment of a first position of the monitor mount with respect to the base in a first direction;
wherein the second linear guide is configured to enable adjustment of a second position of the monitor mount with respect to the base in a second direction perpendicular to the first direction; and
wherein one of the first linear guide and the second linear guide is a horizontal Sarrus linkage.

8. The monitor stand of claim 7, wherein the second linear guide is the horizontal Sarrus linkage, the horizontal Sarrus linkage having a plurality of pairs of links joining the first end of the second linear motion stage to the second end of the second linear motion stage in parallel, each of the plurality of pairs of links comprising two rigid plates coupled together with a hinge.

9. The monitor stand of claim 8, wherein the first linear guide is a vertical Sarrus linkage.

10. The monitor stand of claim 9, the vertical Sarrus linkage having a plurality of pairs of links joining the first end of the first linear motion stage to the second end of the first linear motion stage in parallel, each of the plurality of pairs of links comprising two rigid plates coupled together with a hinge.

11. The monitor stand of claim 7, wherein the spring is a gas spring.

12. The monitor stand of claim 7, further comprising a plurality of counterweights configured to enable a user to add weight to the monitor stand above the spring to balance the weight of at least the monitor mount and the computer monitor with the upward force of the spring.

13. The monitor stand of claim 7, wherein the monitor mount is configured to enable rotation of the computer monitor about three independent axes.

14. A monitor stand, comprising:
a base configured to mount to a horizontal surface;
a first linear motion stage attached to and extending away from the base, the first linear motion stage comprising a first end of the first linear motion stage fixedly attached to the base, a second end of the first linear motion stage, and a first linear guide extending between the first end of the first linear motion stage and the second end of the first linear motion stage;
a second linear motion stage attached to and extending away from the first linear motion stage, the second linear motion stage comprising a first end of the second linear motion stage fixedly attached to the second end of the first linear motion stage, a second end of the second linear motion stage, and a second linear guide extending between the first end of the second linear motion stage and the second end of the second linear motion stage; and
a monitor mount fixedly coupled to the second end of the second linear motion stage and configured to attach to and support a computer monitor;
wherein the first linear guide is configured to enable adjustment of a first position of the monitor mount with respect to the base in a first direction;
wherein the second linear guide is configured to enable adjustment of a second position of the monitor mount with respect to the base in a second direction different from the first direction; and
wherein one of the first linear motion stage and the second linear motion stage comprises a horizontal Sarrus linkage.

15. The monitor stand of claim 14, wherein the second linear guide is the horizontal Sarrus linkage.

16. The monitor stand of claim 15, the horizontal Sarrus linkage having a plurality of pairs of links joining the first end of the second linear motion stage to the second end of the second linear motion stage in parallel, each of the plurality of pairs of links comprising two rigid plates coupled together with a hinge.

17. The monitor stand of claim 15, wherein the first linear guide is a vertical Sarrus linkage.

18. The monitor stand of claim 17, the vertical Sarrus linkage having a plurality of pairs of links joining the first end of the first linear motion stage to the second end of the first linear motion stage in parallel, each of the plurality of pairs of links comprising two rigid plates coupled together with a hinge.

19. The monitor stand of claim 14, wherein the monitor mount is configured to enable rotation of the computer monitor about three independent axes.

20. The monitor stand of claim 14, wherein the base comprises a clamp configured to hold the base to the horizontal surface.

\* \* \* \* \*